(12) United States Patent
Yamazoe

(10) Patent No.: US 10,432,870 B2
(45) Date of Patent: Oct. 1, 2019

(54) ZOOM LENS AND IMAGING APPARATUS

(71) Applicant: Tamron Co., Ltd., Saitama-shi (JP)

(72) Inventor: Junichi Yamazoe, Saitama (JP)

(73) Assignee: Tamron Co., Ltd., Saitama-shi (JP)

( * ) Notice: Subject to any disclaimer, the term of this patent is extended or adjusted under 35 U.S.C. 154(b) by 16 days.

(21) Appl. No.: 15/937,240

(22) Filed: Mar. 27, 2018

(65) Prior Publication Data

US 2019/0020824 A1 Jan. 17, 2019

(30) Foreign Application Priority Data

Jul. 12, 2017 (JP) ................. 2017-135857

(51) Int. Cl.
| | |
|---|---|
| *H04N 5/232* | (2006.01) |
| *G02B 15/20* | (2006.01) |
| *G02B 13/02* | (2006.01) |
| *G03B 5/02* | (2006.01) |
| *G03B 13/00* | (2006.01) |
| *G03B 5/04* | (2006.01) |
| *G02B 15/173* | (2006.01) |
| *G02B 27/64* | (2006.01) |
| *G02B 13/00* | (2006.01) |

(52) U.S. Cl.
CPC ....... *H04N 5/23296* (2013.01); *G02B 13/009* (2013.01); *G02B 13/02* (2013.01); *G02B 15/173* (2013.01); *G02B 15/20* (2013.01); *G03B 5/02* (2013.01); *G03B 5/04* (2013.01); *H04N 5/23287* (2013.01); *G02B 27/646* (2013.01); *G03B 2205/0015* (2013.01); *G03B 2205/0046* (2013.01)

(58) Field of Classification Search
CPC ........... H04N 5/23296; H04N 5/23287; G02B 13/02; G02B 13/009; G02B 15/173; G02B 15/20; G02B 27/646; G03B 5/02; G03B 5/04; G03B 2205/0015; G03B 2205/0046

USPC .......................................... 359/676
See application file for complete search history.

(56) References Cited

U.S. PATENT DOCUMENTS

2015/0085165 A1* 3/2015 Maruyama ........... G02B 15/173
348/240.3

FOREIGN PATENT DOCUMENTS

| JP | 201564492 A | 4/2015 |
|---|---|---|
| JP | 2016126278 A | 7/2016 |

* cited by examiner

*Primary Examiner* — Evan P Dzierzynski
*Assistant Examiner* — Mitchell T Oestreich
(74) *Attorney, Agent, or Firm* — The Webb Law Firm

(57) ABSTRACT

The present invention addresses a problem of providing a zoom lens which achieves a longer focal length and has a shorter optical overall length at the telephoto end, and an imaging apparatus provided with the zoom lens. In order to solve the problem, a zoom lens is configured to include, in order from the object side, a positive first lens group G1, a negative second lens group G2, a positive composite positive lens group, and a negative composite negative lens group. The composite positive lens group includes a positive third lens group G3, and is consisting of one or more lens groups having positive refractive power. The composite negative lens group includes a negative A lens group and a negative B lens group having negative refractive power. In the zoom lens, changing focal length is performed by varying distances between the lens groups, and a predetermined condition is satisfied.

19 Claims, 17 Drawing Sheets

ZOOM LENS AND IMAGING APPARATUS

CROSS-REFERENCE TO RELATED APPLICATION

This application claims priority to Japanese Patent Application No. 2017-135857 filed Jul. 12, 2017, the disclosure of which is hereby incorporated in its entirety by reference.

BACKGROUND OF THE INVENTION

Field of the Invention

The present invention relates to a zoom lens which is suitable as an imaging optical system of a film camera, a video camera, a digital still camera, or the like, and to an imaging apparatus provided with the zoom lens.

Description of the Related Art

A small-sized imaging apparatus (which refers to a compact digital camera, a mirrorless interchangeable lens camera, etc., and is referred to as a "mirrorless camera" hereinafter) requiring no mirror box between an image sensor and an imaging optical system has recently become widespread. Since a demand for high image-quality of such small-sized imaging apparatuses is great, image sensors larger than conventional ones have been adopted. Further, since the main body of an imaging apparatus in a mirrorless camera is smaller than that in a single-lens reflex camera, an imaging optical system in the mirrorless camera also has been demanded to be downsized. In addition, the flange back of a mirrorless camera is much shorter than that of a single-lens reflex camera. Therefore, the focal length of a telephoto zoom lens at the telephoto end has been desired to become longer, while the optical overall length thereof is desired to become shorter in order to avoid upsizing of a barrel.

In order to meet these demands, for example, a small-sized telephoto zoom lens has been realized, which has arranged in order from the object side, a first lens group having positive refractive power, a second lens group having negative refractive power, a composite positive lens group being formed of one or more lens groups and having positive refractive power as a whole, and a composite negative lens group being formed of one or more lens groups and having negative refractive power as a whole, wherein changing focal length is performed by varying distances between the lens groups.

In telephoto zoom lenses, it is common that a zooming action is performed by varying the distance between a first lens group having positive refractive power and a second lens group having negative refractive power. In the telephoto zoom lens configured as above, a positive lens group and a negative lens group are arranged to be closer to the image plane side than the second lens group so as to increase the positive refractive power of the positive lens group, and the magnification of the negative lens group is increased at the telephoto end. As a result, the telephoto ratio is decreased and the optical overall length at the telephoto end is decreased. In addition, the negative lens group is divided into a plurality of lens groups and the lens groups composed of the negative lens group are moved on different tracks during changing focal length. Accordingly, variation in aberration during changing focal length is suppressed and a zoom lens having high optical performance in the entire zoom range can be realized.

As a telephoto zoom lens having such a configuration, a zoom lens disclosed in Japanese Patent Laid-Open No. 2015-64492 and a zoom lens disclosed in Japanese Patent Application, Japanese Patent Laid-Open No. 2016-126278 have been known, for example.

However, in the zoom lens disclosed in Japanese Patent Application, Japanese Patent Laid-Open No. 2015-64492, since the positive refractive power of a positive lens group that is arranged to be closer to the image plane side than a second lens group is small, it is not considered that the optical overall length of the zoom lens at the telephoto end is sufficiently short. Further, in the zoom lens disclosed in Japanese Patent Laid-Open No. 2016-126278, since the magnification of the negative lens group is small at the telephoto end, it is not considered that the optical overall length of the zoom lens at the telephoto end is sufficiently short.

Therefore, a problem to be solved by the present invention is to provide a zoom lens which achieves a longer focal length and has a shorter optical overall length at the telephoto end, and to provide an imaging apparatus provided with the zoom lens.

SUMMARY OF THE INVENTION

In order to solve the above problem, a zoom lens according to the present invention includes, in order from the object side, a first lens group having positive refractive power, a second lens group having negative refractive power, a composite positive lens group which includes, at a most object side, a third lens group having positive refractive power, which is consisting of one or more lens groups having positive refractive power, and which has positive refractive power as a whole, and a composite negative lens group which includes a negative A lens group having negative refractive power and being arranged at a most object side, which further includes at least a negative B lens group having negative refractive power, and which has negative refractive power as a whole. Changing focal length is performed by varying distances between the lens groups, and the following conditions are satisfied:

$$3.44 < \beta rt < 4.50 \tag{1}$$

$$0.10 < f3/(fw \times ft)^{1/2} < 0.46 \tag{2}$$

where $\beta rt$: composite lateral magnification of the composite negative lens group at a telephoto end, f3: focal length of the third lens group, fw: focal length of the zoom lens at a wide angle end, and ft: focal length of the zoom lens at the telephoto end.

In order to solve the aforementioned problem, an imaging apparatus according to the present invention is provided with the zoom lens and an imaging device which is provided to be closer to the image plane than the zoom lens and which converts an optical image formed by the zoom lens to an electrical signal.

According to the present invention, a zoom lens which achieves a longer focal length and has a shorter optical overall length at the telephoto end, and an imaging apparatus provided with the zoom lens can be provided.

Figure 1:
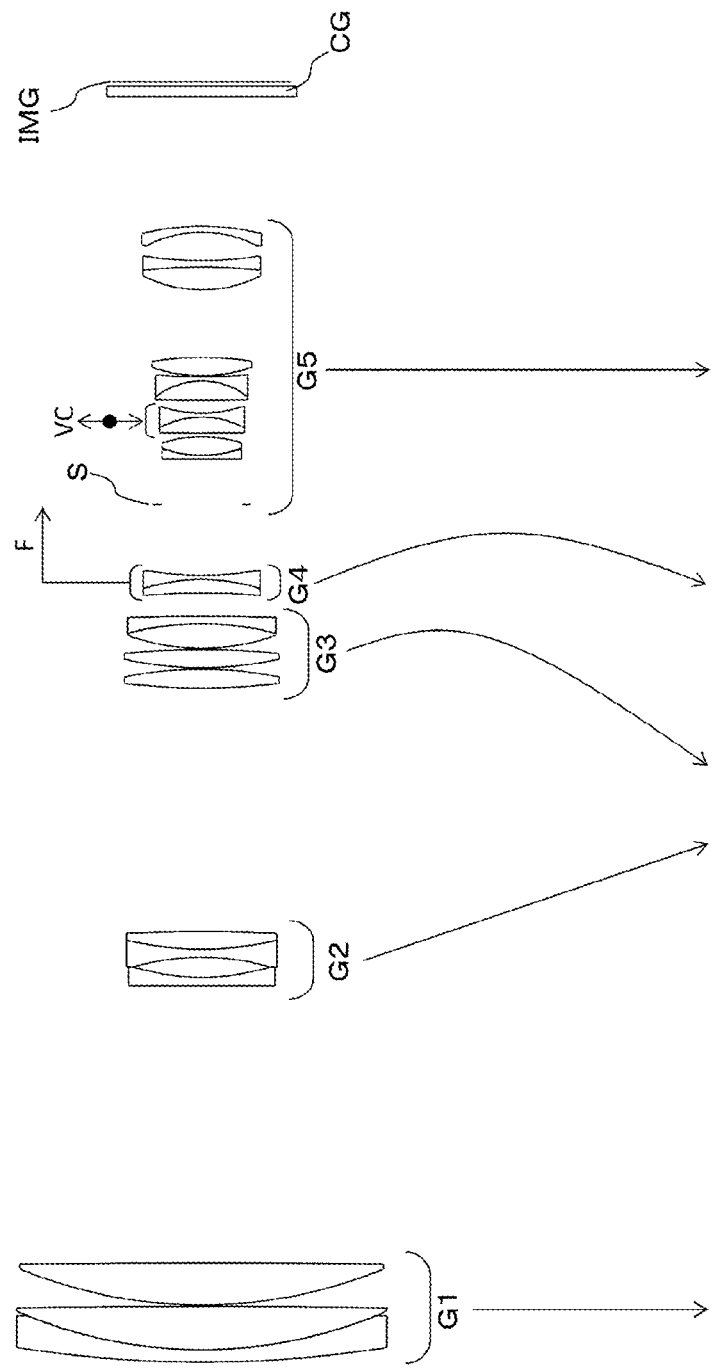
FIG. 1 is a cross-sectional view of a lens configuration example of a zoom lens of Example 1 of the present invention at a time of focusing to infinity at the wide angle end.

Regarding the reference characters used in the drawings, "G1" denotes a first lens group, "G2" denotes a second lens group, "G3" denotes a third lens group, "G4" denotes a fourth lens group, "G5" denotes a fifth lens group, "G6" denotes a sixth lens group, "F" denotes a focusing group, "VC" denotes a vibration-proof group, "S" denotes an aperture stop, and "IMG" denotes an image plane.

DESCRIPTION OF THE INVENTION

Hereinafter, an embodiment of a zoom lens and an imaging apparatus according to the present invention is described. However, a zoom lens and an imaging apparatus described below are one aspect of the zoom lens and the imaging apparatus according to the present invention. The zoom lens and the imaging apparatus according to the present invention are not limited to the following aspect.

1. Zoom Lens 1-1. Configuration of Optical System of Zoom Lens

First, an embodiment of the zoom lens according to the present invention is described. The zoom lens of the present embodiment includes, in order from the object side, a first lens group having positive refractive power, a second lens group having a negative refractive power, a composite positive lens group having positive refractive power as a whole, and a composite negative lens group having negative refractive power as a whole. The composite positive lens group includes, at the most object side, a third lens group having positive refractive power, and is formed of only a lens group having positive refractive power. The composite negative lens group includes a negative A lens group having negative refractive power and being arranged at the most object side, and includes a negative B lens group having negative refractive power. Changing focal length is performed by varying the distances between the lens groups.

According to the zoom lens, the first lens group having positive refractive power and the second lens group having negative refractive power are included, and the distances between the lens groups are varied during changing focal length so that a zooming action can be performed. Also, with this configuration adopted, an optical system having a so-called telephoto configuration, in which incident luminous flux are converged by the first lens group and diverged by the second lens group, can be provided. Accordingly, while the focal length of the zoom lens at the telephoto end is increased, the optical overall length of the zoom lens can be decreased.

At the image plane side than the second lens group, the zoom lens includes, in order from the object side, the composite positive lens group having positive refractive power as a whole and the composite negative lens group having negative refractive power as a whole. The composite positive lens group converges luminous light incident on the composite positive lens group from the second lens group side and the composite negative lens group diverges the luminous light. That is, as a result of arrangement of the composite positive lens group and the composite negative lens group, which form a telephoto configuration, at the image plane side than the second lens group, the optical overall length can be further decreased while the focal length of the zoom lens is further increased at the telephoto end.

Hereinafter, a description about a configuration of the zoom lens is given.

1-1-1. First Lens Group

The specific lens configuration of the first lens group is not limited to a particular configuration as long as the first lens group has positive refractive power as a whole. For example, in order to provide a zoom lens which satisfactorily corrects aberration and which has high performance, the first lens group preferably includes at least one negative lens. The first lens group more preferably has a configuration including, in order from the object side, a negative lens and a positive lens. The first lens group still more preferably has a configuration including, in order from the object side, a negative lens, a positive lens, and a positive lens. Accordingly, while large positive refractive power is arranged in the first lens group, the amount of generation of spherical aberration can be suppressed and a high zoom ratio can be attained. However, a suitable lens configuration can be adopted, as appropriate, according to desired optical performance.

1-1-2. Second Lens Group

The specific lens configuration of the second lens group is also not limited to a particular configuration as long as the second lens group has negative refractive power as a whole. For example, in order to provide a zoom lens which satisfactorily corrects aberration and which has high performance, the second lens group preferably includes at least one positive lens. However, a suitable lens configuration can be adopted, as appropriate, according to desired optical performance.

1-1-3. Composite Positive Lens Group

The composite positive lens group is consisting of one or more lens groups each having positive refractive power and does not include any lens group having negative refractive power. The composite positive lens group has positive refractive power as a whole, and includes, at the most object side, the third lens group having positive refractive power. Since the composite positive lens group is consisting of one or more lens groups having positive refractive power, large positive refractive power can be arranged in the composite positive lens group so that a telephoto zoom lens having a smaller telephoto ratio can be realized.

The number of lens groups having positive refractive power and being included in the composite positive lens group is not limited to a particular number. At the image side than the third lens group, two or more positive lens groups may be provided. When the number of lens groups included in the composite positive lens group becomes greater, the degree of freedom in aberration correction during changing focal length is increased, whereby a telephoto zoom lens having higher performance can be realized. However, since an increase in the number of lens groups involves upsizing of the composite positive lens group, downsizing of the zoom lens may become difficult. Therefore, the number of lens groups included in the composite positive lens group is preferably three or less, and is more preferably two or less.

As described above, the third lens group is arranged at the most object side in the composite positive lens group. The lens configuration of the third lens group is not limited to a particular configuration, but a lens unit having a biconvex shape is preferably arranged at the most object side in the third lens group. A lens unit herein refers to a single lens, a cemented lens, or the like, and the meaning thereof is a unit formed of one or more optical elements integrated with one another without an air interval included therebetween. The single lens may be a spherical lens or an aspherical lens. In this case, the aspherical lens may be a glass-molded aspherical lens or a plastic-molded aspherical lens, or may be a so-called compound aspherical lens having an aspherical film attached on an optical surface thereof. In a case where the lens unit is a single lens, for example, the meaning of the lens unit having a biconvex shape is a single lens having a biconvex shape, i.e., a positive lens having a biconvex shape. Alternatively, in a case where the lens unit is a cemented lens, the meaning is a cemented lens of which the most object side surface is convex toward the object side and of which the most image plane side surface is convex toward the image plane side. The number of lenses included in the cemented lens is not limited to a particular number, but the cemented lens is preferably formed by cementing at least one positive lens and one negative lens.

It is common that a telephoto zoom lens having a small telephoto ratio is easily realized by arranging large negative refractive power in the second lens group. When large negative refractive power is arranged in the second lens group, the ray height (the height from an optical axis) of the outermost ray of an on-axis luminous flux incident on the third lens group becomes high. It is common that the amount of generation of spherical aberration in an optical system is increased by the cubic of the diameter of an entrance pupil in the optical system. When this phenomenon applied to the third lens group is considered, lowering the ray height of the outermost ray of an on-axis luminous flux incident on the third lens group is effective for suppressing the amount of generation of spherical aberration. Therefore, it is preferable that the object side surface of the lens unit arranged at the most object side in the third lens group be convex toward the object side because the ray height can be lowered. In addition, from the same viewpoint, it is preferable that the image-plane side surface of the lens unit arranged at the most object side in the third lens group be convex toward the image plane side because the ray height can be further lowered.

Here, a cemented lens is preferably used as the lens unit having a biconvex shape. In order to lower the ray height so as to suppress the amount of generation of spherical aberration, and further, to suppress the amount of generation of correction of chromatic aberration, a cemented lens obtained by cementing at least one positive lens and a negative lens is preferably arranged at the most object side in the third lens group.

In a case where a positive lens having a biconvex shape is used as the lens unit having a biconvex shape, it is preferable for correction of chromatic aberration that the Abbe number of the positive lens with respect to the d-line be 50 or greater. A glass material the Abbe number of which is 50 or greater with respect to the d-line is a so-called low-dispersion glass material. Since a glass material having a greater Abbe number value is a lower-dispersion glass material, such a glass material is preferable for correction of chromatic aberration. Thus, the upper limit of the Abbe number is not limited to a particular value. However, a glass material having a great Abbe number value is generally expensive. For this reason, the upper limit of the Abbe number is preferably 100 or less from the viewpoint of the cost.

1-1-4. Composite Negative Lens Group

The composite negative lens group includes the negative A lens group and the negative B lens group each having negative refractive power, and has negative refractive power as a whole. In the composite negative lens group, the negative A lens group is arranged at the most object side.

(1) Negative A Lens Group

As long as the negative A lens group has negative refractive power as a whole, the specific lens configuration of the negative A lens group is not limited to a particular configuration. As described later, the negative A lens group may serve as a focusing group and the negative A lens group may be moved in the optical axis direction such that focusing to a proximity object is performed. In this case, the negative A lens group composed of only one lens unit is preferable for weight saving and downsizing of the focusing group. Further, weight saving and downsizing of the focusing group also result in downsizing of a mechanical member for driving the focusing group, so that the weight saving and downsizing of the entire zoom lens unit can be facilitated. The zoom lens unit refers to a configuration including a zoom lens (a zoom lens optical system), a barrel accommodating the zoom lens, various mechanical members arranged in the barrel, a control substrate, and the like.

Moreover, with the configuration of the negative A lens group composed of only one lens unit, eccentricity caused when assembling can be prevented, for example. Accordingly, a manufacturing error can be reduced. As a result, performance deterioration due to a manufacturing error can be suppressed, and a zoom lens having high performance can be easily realized even from the viewpoint of manufacturing.

The description of the lens unit has been given above, and an explanation thereof is omitted here.

When the negative A lens group is formed of a cemented lens having a positive lens and a negative lens cemented and having negative refractive power as a whole, weight saving and downsizing of the focusing group can be facilitated as described above, and further, fluctuation in correction of chromatic aberration can be suppressed at a time of focusing. Accordingly, this is preferable because chromatic aberration can be satisfactorily corrected in the entire focusing region.

Moreover, when the negative A lens group is composed of one single lens (a negative lens) having negative refractive power, further weight saving and further downsizing can be achieved, compared with the case of using a cemented lens. In this case, from the viewpoint of correction of chromatic aberration, the Abbe number of the single lens is preferably 70 or greater with respect to the d-line, similarly to the above case. In addition, from the viewpoint of the cost, the upper limit of the Abbe number is preferably 100 or less, similarly to the above case.

(2) Negative B Lens Group

As long as the negative B lens group has negative refractive power as a whole, the specific lens configuration of the negative B lens group is not limited to a particular configuration.

(3) Number of Lens Groups Included in Composite Negative Lens Group

As long as the composite negative lens group has negative refractive power as a whole, the composite negative lens group may include one or more positive/negative lens groups in addition to the negative A lens group and the negative B lens group. The negative B lens group may be arranged to be closer to the image plane side than the negative A lens group. Between the negative A lens group and the negative B lens group, a lens group having positive refractive power may be arranged, for example. At the image plane side than the negative B lens group, one or more lens groups having positive or negative refractive power may be arranged.

Since increase in the number of the lens groups included in the composite negative lens group results in increase of the degree of freedom in correction of aberration during changing focal length, a zoom lens having higher performance can be realized. For example, a sixth lens group G6 of Example 1 (described later) may be set so as to include, at the object side thereof, a front-side group having negative refractive power and include, at the image plane side thereof, a rear side group having negative refractive power, with the maximum air interval of the sixth lens group G6 interposed. In this configuration, the front side group is moved toward the object side or an image side during changing focal length. Accordingly, the degree of freedom in correction of aberration can be increased. Furthermore, the rear side group may be set as a fixed group during changing focal length, so that an effect of directing a ray upward by means of the rear side group, that is, an effect of increasing the height of a ray incident on the high image height of the imaging device is generated. Then, the ray can be made incident on the imaging device larger than the diameter of a lens arranged at the most image side in a zoom lens. Accordingly, even when a large-size imaging device is used, the entire of the zoom lens can be configured to be small. On the other hand, in a case where the diameter of a lens arranged at the most image side in a zoom lens and the size of the imaging device are free from constraint, a lens group having positive refractive power may be arranged at the most image side in the composite negative lens group. In this case, this lens group having positive refractive power can decrease the image plane incidence angle of a ray with respect to the imaging plane (can enhance the telecentricity) so that the light reception efficiency of the imaging device can be enhanced. Therefore, the number, refractive power, and arrangement, etc. of lens groups included in the composite negative lens group can be selected, as appropriate, according to the specification of the zoom lens or a constraint thereon.

However, it is preferable from the viewpoint of downsizing of the zoom lens that the composite negative lens group be formed of the negative A lens group and the negative B lens group. Refractive power arrangement in which a telephoto configuration is emphasized is required for downsizing of the zoom lens. That is, it is preferable that positive refractive power be arranged at the object side and negative refractive power be arranged at the image plane side. By the composite negative lens group formed of two lens groups including the negative A lens group and the negative B lens group, arrangement of large negative refractive power at the image plane side can be achieved. In addition, making distances between principal points of the lens groups in the composite negative lens group as short as possible leads to decrease in the optical overall length of the zoom lens. Thus, the distances between principal points can be made shorter in the case where the composite negative lens group is formed of two lens groups including the negative A lens group and the negative B lens group, compared with the case where the composite negative lens group is formed of the negative A lens group and a lens group other than the negative B lens group. Moreover, by arrangement of the negative B lens group at the most image plane side in the zoom lens, the ray height of the off-axis luminous flux passing through the negative B lens group and reaching the maximum image height can be lowered, increase in the diameter of the negative B lens group can be suppressed, and even the zoom lens having a small size can be used for a large-sized imaging device.

(4) Lens Arranged at Most Image Plane Side in Composite Negative Lens Group

In order to, while an appropriate back focus required for lens exchange, etc. is secured, avoid radial upsizing of the final lens and support a large-size imaging device, a lens to be arranged at the most image plane side in the composite negative lens group is preferably a lens (a negative lens) having negative refractive power. Arrangement of a negative lens at the most image plane side in the zoom lens can provide effects the same as those described above.

(5) Aperture Stop

In the zoom lens, arrangement of the aperture stop is not limited to particular arrangement. However, in order to facilitate downsizing in the diameter of the aperture stop, the aperture stop is preferably arranged at a position closer to the image plane side than the composite positive lens group, at a position closer to the object side than the composite negative lens group, or within the composite negative lens group.

In particular, in a case where a zoom lens is to be realized of which the F-number is invariable in the entire zoom range (see Example 1, for example), the aperture stop is preferably arranged in the composite negative lens group. In particular, the aperture stop is preferably arranged in a lens group arranged at the most image plane side in the composite negative lens group. In this case, it is preferable that, on condition that a lens group arranged at the most image plane side in the composite negative lens group is set as a fixed group which is fixed with respect to the image plane during changing focal length, the aperture stop be arranged in the lens group arranged at the most image plane side. For example, in a case where a lens group arranged at the most image plane side in the composite negative lens group is the negative B lens group, it is preferable that the aperture stop be arranged at a position closer to the object side than the negative B lens group, within the negative B lens group, or at a position closer to the image plane side than the negative B lens group, such that the aperture stop is fixed, together with the negative B lens group, with respect to the image plane during changing focal length. With this arrangement of the aperture stop, the diameter of the aperture stop can be fixed during changing focal length is performed from the wide angle end to the telephoto end. Accordingly, the zoom lens can be suitably used as an optical system of an imaging apparatus in which the diameter of an aperture is mechanically controlled.

1-2. Operation 1-2-1. Operation During Changing Focal Length

In the zoom lens, changing focal length is performed by varying the distances between the lens groups. Each of the lens groups may be a movable group that moves in the optical axis direction during changing focal length or may be a fixed group which is fixed with respect to the image plane during changing focal length, as long as the distances between the lens groups are variable.

For example, in order to realize a zoom lens having a high zoom ratio, it is preferable that, during changing focal length from the wide angle end to the telephoto end is performed, the distance between the first lens group and the second lens group be increased while the distance between the second lens group and the composite positive lens group (the third lens group) is decreased.

Here, the first lens group may be a movable group or may be a fixed group. When the first lens group is a movable group (see Example 2, for example), the optical overall length of the zoom lens can be made short at the wide angle end. That is, in a case where the first lens group is moved from the image plane side toward the object side during changing focal length from the wide angle end to the telephoto end is performed, the barrel of the zoom lens is formed into a nested structure, whereby the barrel length can be made short at the wide angle end. Accordingly, this is effective for downsizing of the entire zoom lens unit as a product.

In contrast, in a case where the first lens group is a fixed group (see Example 1, Example 3, and Example 4, for example), the first lens group formed of a lens the outer diameter of which is larger than those in the other lens groups is not moved during changing focal length. Thus, fluctuation in the gravity center of the entire zoom lens can be suppressed during changing focal length. As a result, the operability during photographing preferably becomes excellent. In addition, in the case were the first lens group is a fixed group, the barrel length does not change during changing focal length. Thus, the structure of the barrel can be simplified. That is, a nested structure of the barrel is not needed, and any cam structure, etc. does not need to be provided. Accordingly, a dust-proof/water-proof structure is easily provided by sealing of the barrel. Furthermore, the simple barrel structure is preferable because even the manufacturability of the entire zoom lens unit is improved.

A lens group arranged at the most image plane side in the zoom lens, that is, a lens group arranged at the most image plane side in the composite negative lens group is preferably a fixed group. When the lens group (e.g., the negative B lens group) arranged at the most image plane side in the zoom lens is a fixed group, a sealed structure can be easily provided at the image plane side of the barrel. Accordingly, a dust-proof/water-proof structure can be easily provided. Furthermore, the simple barrel structure is preferable because even the manufacturability of the entire zoom lens unit is improved.

In the present invention, varying the distances between the lens groups means that the distances between the all lens groups included in the zoom lens are varied independently. For example, in a case where the composite positive lens group is formed of a plurality of positive lens groups, the distances between the lens groups included in the composite positive lens group are varied independently during changing focal length. The same applies to the composite negative lens group. In a case where the composite negative lens group is formed of the negative A lens group and the negative B lens group, the distance between the negative A lens group and the negative B lens group is varied during changing focal length. In a case where the composite negative lens group includes another lens group, the distance between the other lens group and a lens group adjacent thereto is varied.

1-2-2. Operation at Time of Focusing

In the zoom lens, when focusing to a proximity object is to be performed, a part or some of the lens groups included in the zoom lens can be moved in the optical axis direction such that the focusing can be performed.

In the zoom lens, it is particularly preferable that focusing be performed by movement, in the optical axis direction, of a part or some of the lens groups included in the composite negative lens group. In lens groups arranged to be closer to the object side than the composite negative lens group, i.e., in the first lens group, the second lens group, and the composite positive lens group (the third lens group, and the like), not sufficiently converged luminous flux which are incident on these lens groups. Thus, these lens groups are formed of lenses the outer diameters of which are larger than those of lenses included in the composite negative lens group. For this reason, if a lens group arranged to be closer to the object side than the composite negative lens group serves as a focusing group, the weight saving and downsizing of the focusing group are difficult.

On the other hand, when a part or some of the lens groups included in the composite negative lens group serves as a focusing group, the weight saving and downsizing of the focusing groups can be facilitated. This offers an advantage for achievement of high-speed automatic focusing. Further, since the weight saving and downsizing of the focusing groups can result in, for example, the weight saving and downsizing of mechanical members, the weight saving and downsizing of the entire zoom lens unit can be facilitated. In particular, a lens group having negative refractive power such as the negative A lens group or the negative B lens group included in the composite negative lens group may serve as the focusing group. As a result, weight saving and downsizing of the focusing group are further facilitated, compared with a case where a lens group having positive refractive power serves as a focusing group.

In particular, the negative A lens group which is arranged at the most object side in the composite negative lens group, as described above, is preferable as a focusing group. Since luminous flux which are diverged by the negative A lens group and the image height of which is high are incident on a lens group arranged to be closer to the image plane side than the composite negative lens group, the lens group arranged to be closer to the image plane side than the composite negative lens group is formed of a lens having an optical effective diameter larger than that of the negative A lens group. In the negative A lens group, therefore, weight saving and downsizing of the focusing group can be further facilitated than in the other lens groups having negative refractive power and being included in the composite negative lens group. In the negative A lens group composed of only one lens unit, weight saving and downsizing of the focusing group can be further facilitated, as described above, and an eccentric error, etc. can be suppressed. Therefore, this is preferable even from the viewpoint of manufacturing.

When a lens group includes a plurality of lenses (including a cemented lens), a part of the lens group means a partial lens group composed of some of the plurality of lenses forming the lens group. For example, the aforementioned lens unit may serve as a partial lens group.

1-2-3. Operation at Vibration-Proof Time

In the zoom lens, at least one of the lenses included in the zoom lens may serve as a vibration-proof group capable of moving an image by being moved in a direction perpendicular to the optical axis. That is, at least one of the lenses forming the zoom lens serves as a vibration-proof group movable in the direction perpendicular to the optical axis so that, when image blurring such as a so-called hand shake has occurred, the vibration-proof group is moved in the direction perpendicular to the optical axis so as to move an image. Accordingly, so-called hand-shake correction (image blurring correction) can be performed. The vibration-proof group may be composed of a plurality of lenses. However, the vibration-proof group composed of only one lens unit as described above, that is, one single lens or one cemented lens is preferable for weight saving and downsizing of the vibration-proof group.

1-3. Conditional Expressions

The zoom lens has the aforementioned configuration and satisfies at least one of conditional expressions described below. As a result, a zoom lens can be realized which achieves a longer focal length at the telephoto end and has a shorter optical overall length, and which has high optical performance.

1-3-1. Conditional Expression (1)

It is preferable that the zoom lens particularly satisfy the following conditional expression (1).

$$3.44 < \beta rt < 4.50 \quad (1)$$

where $\beta rt$: composite lateral magnification of the composite negative lens group at the telephoto end The conditional expression (1) defines the composite lateral magnification of the composite negative lens group at the telephoto end, which means the same as the lateral magnification of the composite negative lens group at the telephoto end. When the conditional expression (1) is satisfied, the refractive power arrangement having a telephoto configuration emphasized is achieved at the telephoto end, the optical overall length can be decreased relative to the focal length, and excellent aberration correction can be performed. To provide refractive power arrangement having a telephoto configuration emphasized, the composite lateral magnification of the composite negative lens group satisfies the conditional expression (1), irrespective of the number of lens groups included in the composite negative lens group or power arrangement of the lens groups in the composite negative lens group, so that a zoom lens having a telephoto configuration emphasized can be realized.

When the numerical value of the conditional expression (1) is equal to or less than the lower limit value, the composite lateral magnification of the composite negative lens group at the telephoto end is small and the image enlargement effect is low. As a result, the telephoto ratio is difficult to decrease so that the optical overall length is difficult to decrease at the telephoto end. In contrast, when the numerical value of the conditional expression (1) is equal to or greater than the upper limit value, the composite lateral magnification of the composite negative lens group at the telephoto end is large and the image enlargement effect is high. This is preferable for realization of a zoom lens having a small telephoto ratio, but makes aberration correction difficult. Accordingly, a zoom lens having high optical performance is unfavorably difficult to realize.

In order to provide the aforementioned effects, the lower limit value of the conditional expression (1) is preferably 3.45. The upper limit value of the conditional expression (1) is preferably 4.40 and is more preferably 4.30.

1-3-2. Conditional Expression (2)

It is preferable that the zoom lens particularly satisfy the following conditional expression (2).

$$0.10 < f3/(fw \times ft)^{1/2} < 0.46 \quad (2)$$

where f3: focal length of the third lens group fw: focal length of the zoom lens at the wide angle end ft: focal length of the zoom lens at the telephoto end The conditional expression (2) defines the ratio of the focal length of the third lens group to the geometric mean of the focal lengths of the zoom lens at the wide angle end and the telephoto end. That is, the conditional expression (2) defines the ratio of the focal length of the third lens group to the effective focal length. When the conditional expression (2) is satisfied, the refractive power of the third lens group falls within an appropriate range with respect to the focal length of the zoom lens, in the entire zoom range of the zoom lens. Accordingly, the amount of movement of the third lens group during changing focal length can fall within an appropriate range, so that downsizing of the zoom lens can be facilitated. At the same time, spherical aberration and on-axis chromatic aberration can be satisfactorily corrected, so that efficient optical performance can be obtained in the entire zoom range.

On the other hand, when the numerical value of the conditional expression (2) is equal to or less than the lower limit value, the refractive power of the third lens group becomes excessively large relative to the effective focal length of the zoom lens. Accordingly, spherical aberration and on-axis chromatic aberration are difficult to sufficiently correct. As a result, a zoom lens having high optical performance in the entire zoom range is difficult to realize. In contrast, when the numerical value of the conditional expression (2) is equal to or greater than the upper limit value, the refractive power of the third lens group becomes excessively small relative to the effective focal length of the zoom lens. Accordingly, the amount of movement of the third lens group during changing focal length needs to be increased in order to obtain a zoom lens having a high zoom ratio. As a result, downsizing of the zoom lens is difficult and the zoom lens cannot have the telephoto configuration emphasized. Thus, a zoom lens in which the telephoto ratio is small and the optical overall length is short relative to the focal length, is difficult to realize.

1-3-3. Conditional Expression (3)

It is preferable that the third lens group in the zoom lens include at least one positive lens made from an anomalous dispersion glass material satisfying the following conditional expression with respect to the g-line and the F-line.

$$0.012 < \Delta PgF3 < 0.100 \quad (3)$$

where $\Delta PgF3$: deviation of a partial dispersion ratio of the anomalous dispersion glass material (an anomalous dispersion glass material (a third anomalous dispersion glass material) which is used for at least one positive lens included in the third lens group) from a reference line when a line passing through coordinates of glass material C7 (partial dispersion ratio: 0.5393, Abbe numbers vd: 60.49) and coordinates of glass material F2 (partial dispersion ratio: 0.5829, Abbe numbers vd: 36.30) is assumed to be the reference line.

The third lens group has positive refractive power. In a lens group having positive refractive power, a negative lens made from a high-dispersion glass material (having an Abbe number of less than 50 with respect to the d-line, for example) and a positive lens made from a low-dispersion glass material (having an Abbe number of 50 or greater with respect to the d-line, for example) are commonly used in combination such that chromatic aberration is corrected. However, if the abscissa shows a wavelength and the ordinate shows a refractive index, the dispersion performance of the high-dispersion glass material is substantially expressed by a quadric curve and the dispersion performance of the low-dispersion glass material is substantially expressed by a straight line. For this reason, even when these two lenses are combined, chromatic aberration is difficult to completely correct. The dispersion performance of an anomalous dispersion glass material satisfying the conditional expression (3) is substantially expressed by a quadric curve. For this reason, when the third lens group includes at least one positive lens made from an anomalous dispersion glass material satisfying the conditional expression (3), chromatic aberration can be more satisfactorily corrected in all the wavelength bands. Accordingly, a zoom lens in which on-axis chromatic aberration is more satisfactorily corrected in the entire zoom range can be realized.

In order to provide the aforementioned effects, the lower limit value of the conditional expression (3) is more preferably 0.018. The upper limit of the conditional expression (3) is more preferably 0.080 and is still more preferably 0.060.

When the refractive indexes of a glass with respect to the g-line (435.8 nm), the F-line (486.1 nm), the d-line (587.6 nm), and the C-line (656.3 nm) are defined as Ng, NF, Nd, and NC, respectively, the Abbe number (vd) and the partial dispersion ratio (PgF) can be expressed as follows.

$$vd = (Nd-1)/(NF-NC)$$

$$PgF = (Ng-NF)/(NF-NC)$$

Moreover, the coordinates of the glass material C7 and the coordinates of the glass material F2 are based on a coordinate system in which the ordinate shows the partial dispersion ratio and the abscissa shows the Abbe number vd with respect to the d-line.

1-3-4. Conditional Expression (4)

It is preferable that the first lens group in the zoom lens include at least one positive lens made from an anomalous dispersion glass material satisfying the following condition with respect to the g-line and the F-line.

$$0.012 < \Delta PgF1 < 0.100 \quad (4)$$

where $\Delta PgF1$: deviation of a partial dispersion ratio of the anomalous dispersion glass material (an anomalous dispersion glass material (a first anomalous dispersion glass material) which is used for at least one positive lens included in the first lens group) from a reference line when a line passing through coordinates of glass material C7 (partial dispersion ratio: 0.5393, Abbe numbers vd: 60.49) and coordinates of glass material F2 (partial dispersion ratio: 0.5829, Abbe numbers vd: 36.30) is assumed to be the reference line.

The first lens group is also a lens group having positive refractive power. Thus, for the same reason as that having been described in terms of the conditional expression (3), when the first lens group includes at least one positive lens made from an anomalous dispersion glass material satisfying the conditional expression (4), chromatic aberration can be more satisfactorily corrected in all the wavelength bands. Thus, a zoom lens in which on-axis chromatic aberration is more satisfactorily corrected particularly at the telephoto end can be realized.

In order to provide the aforementioned effects, the lower limit value of the conditional expression (4) is more preferably 0.018. The upper limit value of the conditional expression (4) is more preferably 0.080 and is still more preferably 0.060.

1-3-5. Conditional Expression (5)

It is preferable that the zoom lens preferably satisfy the following conditional expression.

$$0.25 < f1/ft < 0.61 \quad (5)$$

where $f1$: focal length of the first lens group

The conditional expression (5) defines the ratio of the focal length of the first lens group with respect to the focal length of the zoom lens at the telephoto end. When the conditional expression (5) is satisfied, the refractive power of the first lens group falls within an appropriate range with respect to the focal length of the zoom lens at the telephoto end so that an optical system can be formed so as to have a telephoto configuration emphasized at the telephoto end. As a result, the optical overall length can be further decreased at the telephoto end, so that a small-sized zoom lens having a small telephoto ratio can be realized. At the same time, the refractive power of the first lens group falls within the appropriate range. Accordingly, spherical aberration and on-axis chromatic aberration can be satisfactorily corrected so that a zoom lens having high optical performance in the entire zoom range can be more easily realized.

On the other hand, when the numerical value of the conditional expression (5) is equal to or less than the lower limit value, the refractive power of the first lens group becomes excessively large relative to the focal length of the zoom lens at the telephoto end, and thus, spherical aberration and on-axis chromatic aberration are difficult to correct. As a result, a zoom lens having high optical performance in the entire zoom range is difficult to realize. In contrast, when the numerical value of the conditional expression (5) is equal to or greater than the upper limit value, the refractive power of the first lens group becomes small relative to the focal length of the zoom lens at the telephoto end. In this case, an optical system having a telephoto configuration emphasized at the telephoto end is difficult to obtain, the optical overall length is increased at the telephoto end, and thus, a small-sized zoom lens is difficult to realize.

In order to provide the aforementioned effects, the lower limit value of the conditional expression (5) is more preferably 0.28 and is still more preferably 0.31. The upper limit value of the conditional expression (5) is more preferably 0.59, is still more preferably 0.56, is yet more preferably 0.54, and is yet more preferably 0.50.

1-3-6. Conditional Expression (6)

It is preferable that the first lens group in the zoom lens include at least one negative lens made from an anomalous dispersion glass material satisfying the following conditional expression.

$$-0.010 < \Delta PgFn < 0.012 \tag{6}$$

where $\Delta PgFn$: deviation of a partial dispersion ratio of the anomalous dispersion glass material (an anomalous dispersion glass material (a second anomalous dispersion glass material) which is used for at least one negative lens included in the first lens group) from a reference line when a line passing through coordinates of glass material C7 (partial dispersion ratio: 0.5393, Abbe numbers vd: 60.49) and coordinates of glass material F2 (partial dispersion ratio: 0.5829, Abbe numbers vd: 36.30) is assumed to be the reference line.

As described as to the conditional expression (3) and the conditional expression (4), when chromatic aberration is to be corrected in a lens group having positive refractive power, a negative lens made from a high-dispersion glass material and a positive lens made from a low-dispersion glass material are typically used in combination such that chromatic aberration is corrected. However, even when these two lenses are combined, chromatic aberration is difficult to completely correct. When at least one negative lens the dispersion performance of which is substantially expressed by a quadric curve and which is made from an anomalous dispersion glass material satisfying the conditional expression (6), is provided, chromatic aberration can be more satisfactorily corrected in all the wavelength bands. In this case, the first lens group may include not only a positive lens satisfying the conditional expression (4) but also a negative lens satisfying the conditional expression (6). As a result, a zoom lens in which on-axis aberration is very satisfactorily corrected particularly at the telephoto end can be obtained. Note that the first to the third anomalous dispersion glass materials may be the same glass material or may be different glass materials.

In order to provide the aforementioned effects, the lower limit value of the conditional expression (6) is more preferably −0.009 and is still more preferably −0.008. The upper limit value of the conditional expression (6) is more preferably 0.010, is still more preferably 0.008, and is yet more preferably 0.006.

1-3-7. Conditional Expression (7)

It is preferable that the zoom lens satisfy the following conditional expression.

$$0.50 < Lt/ft < 0.73 \tag{7}$$

where

Lt: distance from the most object side surface to the image plane in the zoom lens at the telephoto end The conditional expression (7) defines the ratio of the optical overall length (Lt) of the zoom lens with respect to the focal length of the zoom lens at the telephoto end. That is, the conditional expression (7) indicates a so-called telephoto ratio of the zoom lens. In the conditional expression (7), "Lt" represents a distance from the most object side surface to the image plane in the zoom lens at the telephoto end, and is an air conversion length including no dummy glass or the like. When the conditional expression (7) is satisfied, the optical overall length of the zoom lens can be sufficiently decreased relative to the focal length at the telephoto end so that a small-sized zoom lens can be realized. At the same time, spherical aberration and on-axis chromatic aberration can be satisfactorily corrected even at the telephoto end so that a zoom lens having high optical performance in the zoom range can be realized.

On the other hand, when the numerical value of the conditional expression (7) is equal to or less than the lower limit value, the telephoto ratio becomes excessively small. Accordingly, this is not unfavorable for downsizing of the zoom lens but spherical aberration and on-axis chromatic aberration are difficult to correct because large positive or negative refractive power is arranged at each of the object side and the image plane side. Moreover, since the sensitivity in assembling becomes high, aberration caused by an assembling error easily occurs. For this reason, highly precise assembling and high component precision are required. This is not preferable even from the viewpoint of manufacturing. In contrast, when the numerical value of the conditional expression (7) is equal to or greater than the upper limit value, downsizing of the zoom lens is difficult because the telephoto ratio is large. In addition, the optical overall length is increased relative to the focal length at the telephoto end.

In order to provide the aforementioned effects, the lower limit value of the conditional expression (7) is more preferably 0.51 and is still more preferably 0.52. The upper limit value of the conditional expression (7) is more preferably 0.71, is still more preferably 0.69, and is yet more preferably 0.67.

1-3-8. Conditional Expression (8)

It is preferable that the zoom lens satisfy the following conditional expression.

$$-1.83 < \beta 3rt < -0.95 \tag{8}$$

where $\beta 3rt$: composite lateral magnification of the third lens group and all the lens groups therebehind at the telephoto end The conditional expression (8) defines the composite lateral magnification of the third lens group and all the lens groups therebehind in the zoom lens at the telephoto end. Here, the composite lateral magnification of the third lens group and all the lens groups therebehind at the telephoto end is the composite lateral magnification of the composite positive lens group and the composite negative lens group at the telephoto end, in other words. When the conditional expression (8) is satisfied, the third lens group is arranged at an appropriate position at the telephoto end so that a zoom lens having a telephoto configuration emphasized can be more easily realized.

On the other hand, when the numerical value of the conditional expression (8) is equal to or less than the lower limit value, the arrangement position of the third lens group at the telephoto end is excessively close to the object side so that the optical overall length of the zoom lens at the telephoto end is unfavorably difficult to decrease. In contrast, when the numerical value of the conditional expression (8) is equal to or greater than the upper limit value, a large magnification of the third lens group and the lens groups arranged therebehind cannot be obtained at the telephoto end. As a result, the focal length of the zoom lens is difficult to increase at the telephoto end. In addition, in this case, the complex focal length of the first lens group and the second lens group is increased so that the telephoto configuration is diminished. Accordingly, a zoom lens having a short optical overall length relative to the focal length is difficult to realize.

In order to provide the aforementioned effects, the lower limit value of the conditional expression (8) is more preferably −1.81, is still more preferably −1.78, is yet more preferably −1.73, and is yet more preferably −1.68. The upper limit value of the conditional expression (8) is more preferably −0.98, is still more preferably −1.02, is yet more preferably −1.06, and is yet more preferably −1.10.

1-3-9. Conditional Expression (9)

It is preferable that the zoom lens satisfy the following conditional expression.

$$-4.50 < \beta 2t < -0.90 \quad (9)$$

where $\beta 2t$: lateral magnification of the second lens group at the telephoto end The conditional expression (9) defines the lateral magnification of the second lens group at the telephoto end. When the conditional expression (9) is satisfied, an image enlargement effect provided by the second lens group falls within an appropriate range so that a zoom lens having a telephoto configuration emphasized can be realized. At the same time, excellent aberration correction can be performed. Accordingly, both high-performance of the zoom lens and downsizing of the zoom lens can be more easily achieved.

On the other hand, when the numerical value of the conditional expression (9) is equal to or less than the lower limit value, an image enlargement effect of the second lens group at the telephoto end is excessively high, aberration generated in the first lens group is greatly expanded in the second lens group. In order to realize a zoom lens having high optical performance, the number of lenses included in the first lens group and the number of lenses included in the second lens group need to be increased, generation of aberration in the first lens group needs to be suppressed, and aberration generated in the first lens group needs to be corrected at the second lens group. Accordingly, downsizing of the zoom lens is difficult. In addition, this is not preferable even from the viewpoint of weight saving and cost reduction. In contrast, when the numerical value of the conditional expression (9) is equal to or greater than the upper limit, an image enlargement effect of the second lens group at the telephoto end becomes low. As a result, the complex focal length of the first lens group and the second lens group becomes long and the telephoto configuration is diminished. Accordingly, the optical overall length is difficult to decrease.

In order to provide the aforementioned effects, the lower limit value of the conditional expression (9) is more preferably −4.00, is still more preferably −3.60, is yet more preferably −3.40, is yet more preferably −2.90, and is yet more preferably −2.40. The upper limit value of the conditional expression (9) is more preferably −0.95, is still more preferably −0.99, is yet more preferably −1.12, is yet more preferably −1.25, and is yet more preferably −1.35.

1-3-10. Conditional Expression (10)

It is preferable that the zoom lens satisfy the following conditional expression.

$$0.95 < \beta LAt/\beta LBt < 4.00 \quad (10)$$

where $\beta LAt$: lateral magnification of negative A lens group at the telephoto end $\beta LBt$: lateral magnification of negative B lens group at the telephoto end The conditional expression (10) defines the lateral magnification ratio of the negative A lens group and the negative B lens group, which are included in the composite negative lens group, at the telephoto end. When the conditional expression (10) is satisfied, radial downsizing of the composite negative lens group is facilitated even in a case where a large-sized imaging device is used, and a zoom lens having excellent optical performance can be realized with a small number of lenses.

On the other hand, when the numerical value of the conditional expression (10) is equal to or less than the lower limit value, an image enlargement effect provided by the negative A lens group at the telephoto end becomes excessively lower than an image enlargement effect provided by the negative B lens group. Accordingly, in order to support a large-sized imaging device, the composite negative lens group needs to be formed by use of a lens having a large outer diameter. Thus, radial downsizing of the composite negative lens group is difficult. In contrast, when the numerical value of the conditional expression (10) is equal to or greater than the upper limit value, an image enlargement effect provided by the negative A lens group at the telephoto end becomes excessively higher than an image enlargement effect provided by the negative B lens group. Since luminous flux diverged by the negative A lens group are incident on the negative B lens group, radial downsizing of the negative B lens group is difficult. At the same time, the mount of generation of aberration such as curvature of the image plane at the negative A lens group is increased. As a result, the number of lenses for correcting such aberration is increased in order to obtain excellent optical performance. This involves upsizing of the negative A lens group, increase in the optical overall length of the zoom lens, and increase in the cost.

In order to provide the aforementioned effects, the lower limit value of the conditional expression (10) is more preferably 0.97. The upper limit value of the conditional expression (10) is more preferably 3.00, is still more preferably 2.70, and is yet more preferably 2.50.

1-3-11. Conditional Expression (11)

It is preferable that the zoom lens satisfy the following conditional expression.

$$0.05 < CrLAr/ft < 0.18 \quad (11)$$

where

CrLAr: curvature radius of a most image plane side surface in the negative A lens group The conditional expression (11) defines the ratio of the curvature radius of a surface arranged at the most image plane side in the negative A lens group which is arranged at the most object side in the composite negative lens group, with respect to the focal length of the zoom lens at the telephoto end. When the conditional expression (11) is satisfied, the curvature radius of the most image plane side surface in the negative A lens group falls within an appropriate range. Accordingly, curvature of the image plane can be satisfactorily corrected so that a zoom lens having excellent optical performance can be more easily realized.

On the other hand, when the numerical value of the conditional expression (11) is equal to or less than the lower limit value, the curvature radius of the most image plane surface in the negative A lens group becomes excessively small relative to the focal length of the zoom lens at the telephoto end. Accordingly, the amount of generation of curvature of the image plane is so large that correction of the curvature is difficult. In contrast, when the numerical value of conditional expression (11) is equal to or greater than the upper limit value, the curvature radius of the most image plane surface in the negative A lens group becomes excessively large relative to the focal length of the zoom lens at the telephoto end. Accordingly, correction of the curvature of the image plane is unfavorably insufficient.

In order to provide the aforementioned effects, the lower limit value of the conditional expression (11) is more preferably 0.06 and is still more preferably 0.07. The upper limit value of the conditional expression (11) is more preferably 0.17 and is still more preferably 0.16.

1-3-12. Conditional Expression (12)

It is preferable that the zoom lens satisfy the following conditional expression.

$$-0.85 < f2/fw < -0.10 \quad (12)$$

where f2: focal length of the second lens group

The conditional expression (12) defines the ratio of the focal length of the second lens group to the focal length of the zoom lens at the wide angle end. When the conditional expression (12) is satisfied, the refractive power of the second lens group at the wide angle end can fall within an appropriate range, so that curvature of the image plane and distortion aberration, which are likely to be generated at the wide angle end, can be satisfactorily corrected. As a result, a zoom lens having high optical performance in the entire zoom range can be more easily realized. In addition, since a sufficient image enlargement effect of the second lens group is obtained, the outer diameter of a lens included in the first lens group can be made small, so that downsizing of the zoom lens in the radial direction is facilitated.

On the other hand, when the numerical value of the conditional expression (12) is equal to or less than the lower limit value, the refractive power of the second lens group is small relative to the focal length of the zoom lens at the wide angle end. Accordingly, a sufficient image enlargement effect of the second lens group cannot be obtained, and the first lens group needs to be formed of a lens having a large outer diameter in order to realize a zoom lens having a high zoom ratio, so that radial downsizing of the zoom lens is difficult, and further, the telephoto configuration is diminished. As a result, the optical overall length is unfavorably difficult to decrease. In contrast, when the numerical value of the conditional expression (12) is equal to or greater than the upper limit value, the refractive power of the second lens group is large relative to the focal length of the zoom lens at the wide angle end. Accordingly, curvature of the image plane or distortion aberration is likely to be generated at the wide angle end, and satisfactory correction of such curvature or aberration is unfavorably difficult.

In order to provide the aforementioned effects, the lower limit value of the conditional expression (12) is more preferably −0.80, is still more preferably −0.75, is yet more preferably −0.72, is yet more preferably −0.68, is yet more preferably −0.60, is yet more preferably −0.55, and is most preferably −0.49. The upper limit value of the conditional expression (12) is more preferably −0.12, is still more preferably −0.14, is yet more preferably −0.16, and is yet more preferably −0.18.

1-3-13. Conditional Expression (13)

It is preferable that the zoom lens satisfy the following conditional expression.

$$2.50 < |f1/f2| < 5.10 \quad (13)$$

where f1: focal length of the first lens group
f2: focal length of the second lens group The conditional expression (13) defines the absolute value of the ratio of the focal length of the first lens group to the focal length of the second lens group. When the conditional expression (13) is satisfied, the refractive power of the first lens group falls within an appropriate range with respect to the focal length of the second lens group so that distortion aberration can be satisfactorily corrected at the wide angle end and spherical aberration and on-axis chromatic aberration can be satisfactorily corrected at the telephoto end. As a result, a zoom lens having high optical performance in the entire zoom range can be more easily realized. In addition, since the zoom lens can be formed so as to have a telephoto configuration emphasized at the telephoto end, the optical overall length can be decreased.

On the other hand, when the numerical value of the conditional expression (13) is equal to or less than the lower limit value, the refractive power of the first lens group becomes excessively large relative to the focal length of the second lens group. As a result, distortion aberration at the wide angle end, and spherical aberration and on-axis chromatic aberration at the telephoto end are difficult to correct. Accordingly, a zoom lens having high optical performance in the entire magnification variable range is difficult to realize. In contrast, when the numerical value of the conditional expression (13) is equal to or greater than the upper limit value, the refractive power of the first lens group becomes excessively small relative to the focal length of the second lens group. As a result, the zoom lens is difficult to form so as to have a telephoto configuration emphasized at the telephoto end, and the optical overall length is difficult to decrease.

In order to provide the aforementioned effects, the lower limit value of the conditional expression (13) is more preferably 2.80, is still more preferably 2.95, is yet more preferably 3.10, and is yet more preferably 3.35. The upper limit value of the conditional expression (13) is more preferably 4.95, is still more preferably 4.90, is yet more preferably 4.85, is yet more preferably 4.80, is yet more preferably 4.70, and is most preferably 4.60.

1-3-14. Conditional Expression (14)

It is preferable that the zoom lens include the aforementioned vibration-proof group. When the zoom lens includes the vibration-proof group, it is preferable that the zoom lens satisfy the following conditional expression.

$$-6.00<(1-\beta vct)\times\beta vcrt<-0.50 \quad (14)$$

where

βvct: lateral magnification of the vibration-proof group at the telephoto end

βvcrt: composite lateral magnification of all the lens groups arranged to be closer to the image side than the vibration-proof group at the telephoto end In a case where the zoom lens includes the aforementioned vibration-proof group, the conditional expression (14) defines the ratio of the amount of movement of the vibration-proof group in a direction perpendicular to the optical axis and the amount of movement of an image on the image plane at a vibration-proof time. Here, the numerical range defined by the conditional expression (14) is negative. Accordingly, in the zoom lens, the vibration-proof group is preferably formed of a lens having negative refractive power or of a lens group having negative refractive power as a whole. When the vibration-proof group includes a lens, etc. having negative refractive power rather than a lens, etc. having positive refractive power, weight saving of the vibration-proof group can be facilitated and weight saving and downsizing of a mechanical member for driving the vibration-proof group can be facilitated. When the conditional expression (14) is satisfied, the amount of movement of the vibration-proof group at a vibration-proof time can fall within an appropriate range. As a result, so-called hand-shake correction (image blurring correction) can be satisfactorily performed.

On the other hand, when the numerical value of the conditional expression (14) is equal to or less than the lower limit value, the amount of movement of an image on the image plane excessively large relative to the amount of movement of the vibration-proof group at a vibration-proof time. Accordingly, movement of the vibration-proof group needs to be controlled with high accuracy to make the amount of movement of an image on the image plane appropriate during so-called hand-shake correction, and the control is unfavorably difficult. In contrast, when the numerical value of the conditional expression (14) is equal to or greater than the upper limit value, the amount of movement of an image on the image plane is excessively small relative to the amount of movement of the vibration-proof group at a vibration-proof time. Accordingly, the vibration-proof group needs to be largely moved in the direction perpendicular to the optical axis in order to make the amount of movement of an image on the image plane appropriate during hand hand-shake correction. In this case, the diameter of the barrel needs to be increased, and further, a mechanical member for moving the vibration-proof group is upsized, and thus, the size and the weight of the entire zoom lens unit are increased.

In order to facilitate downsizing of the entire zoom lens unit, the vibration-proof group is preferably arranged in the composite negative lens group.

In order to provide the aforementioned effects, the lower limit value of the conditional expression (14) is more preferably −5.00, is still more preferably −4.00, is yet more preferably −3.00, and is yet more preferably −2.00. The upper limit value of the conditional expression (14) is more preferably −0.80, is still more preferably −0.90, is yet more preferably −1.10, is yet more preferably −1.30, and is yet more preferably −1.50.

2. Imaging Apparatus

Next, an imaging apparatus according to the present invention is described. The imaging apparatus according to the present invention is provided with the zoom lens according to the present invention and an imaging device which is arranged to be closer to the image plane side than the zoom lens and which converts an optical image formed by the zoom lens to an electrical signal.

In the present invention, the imaging device and the like are not limited to particular ones. For example, an image sensor such as a CCD (charge coupled device) sensor or a CMOS (complementary metal oxide semiconductor) sensor may be used.

In particular, in the zoom lens, a flange back suitable for a lens interchangeable system such as a single lens reflex camera or a mirrorless camera can be ensured even at the wide angle end. Therefore, the imaging apparatus is suitable as an imaging apparatus to which such a lens interchangeable system is applied.

Figure 21:
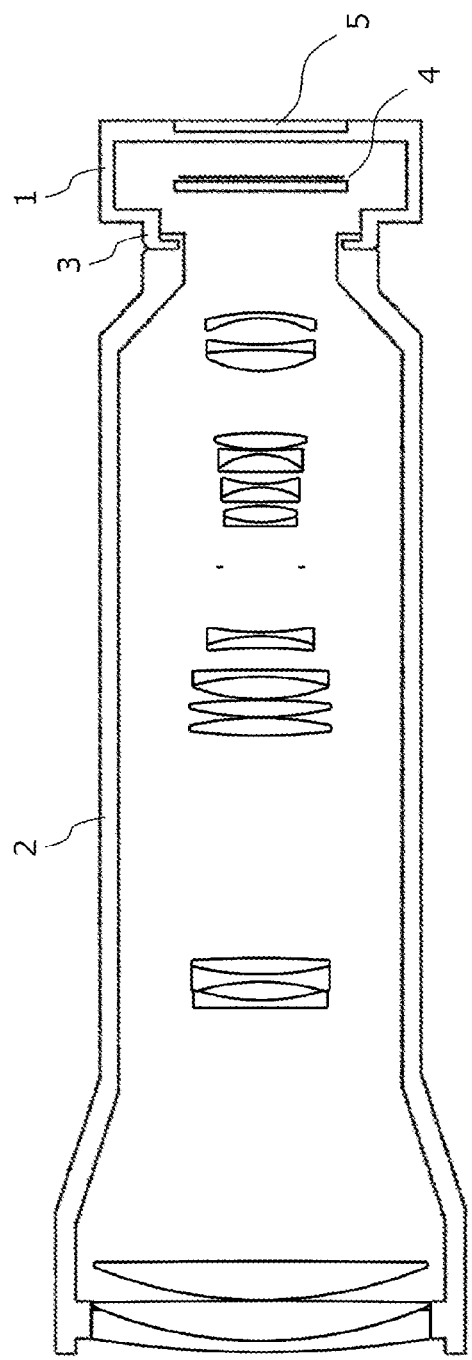
FIG. 21 is a schematic diagram conceptually illustrating a cross-section configuration example of an imaging apparatus according to the present invention.

FIG. 21 illustrates a specific configuration example of the imaging apparatus. FIG. 21 is a diagram schematically illustrating a cross section of a lens interchangeable imaging apparatus 1. As illustrated in FIG. 21, in the lens interchangeable imaging apparatus 1, a barrel part 2 accommodating the zoom lens is fixed to a mounting part 3 of the imaging apparatus 1 in an attachable/detachable manner. The imaging apparatus 1 includes an imaging device 4 at a position closer to the image plane side than the zoom lens. On the imaging plane of the imaging device 4, an optical image is formed by the zoom lens. The optical image formed on the imaging plane is converted to an electrical signal by the imaging device 4. Image data generated on the basis of the electrical signal is outputted to an image output device such as a back monitor provided on the rear surface of the imaging apparatus 1.

It is preferable that the imaging apparatus be configured to have an image processing unit that electrically processes an optical image (image data) converted to an electrical signal by the imaging device, such that the image processing unit can perform image processing on the image data. For example, an optical image obtained by imaging of an object with use of the zoom lens may include distortion (a deviation from an ideal object image) caused by various types of aberration of the zoom lens, relative to an ideal object image. Thus, on the basis of the aberration characteristics of the zoom lens, data for image correction is prepared in advance to correct such aberration. The image processing unit electrically processes the image data by using the data for image correction. As a result, image data in which distortion in the optical image has been corrected can be generated. The imaging apparatus may include a distortion correction data storage unit which stores in advance the data for image correction, or may include a data storage unit configured to be able to store the data for image correction.

Also, the imaging apparatus may include communication means such as wireless communication means, and include a data acquiring unit that acquires, through the communication means, data for image correction stored in an external device, such that the image processing unit may electrically process the image data by using the data for image correction acquired through the communication means. The image processing is not particularly limited to these specific aspects. An ideal object image herein refers to an optical image obtained when an object is imaged with use of an aberration-free lens (zoom lens).

The imaging apparatus may be configured to include the image processing unit such that the image processing unit can correct, for example, distortion in the optical image caused by distortion aberration by using data for distortion aberration correction prepared in advance. In this case, the negative refractive power of the composite negative lens group in the zoom lens can be increased with a small number of lenses. This is preferable because downsizing and weight saving of the composite negative lens group can be facilitated, the optical overall length of the zoom lens can be decreased, and radial downsizing of the zoom lens can be also facilitated.

Also, the imaging apparatus may be configured to include the image processing unit such that the image processing unit can correct, for example, distortion in the optical image caused by magnification chromatic aberration by using data for magnification chromatic aberration correction prepared in advance. In this case, the number of lenses required for chromatic aberration correction can be reduced. As a result, downsizing and weight saving of the zoom lens can be achieved and the cost can be reduced.

Next, the present invention is specifically described with use of examples. However, the present invention is not limited to the following examples. Each of the zoom lenses of the following examples is a zoom lens (a variable-magnification optical system) for use in the imaging apparatus (an optical apparatus), and can be particularly preferably applied to an imaging apparatus using a lens interchangeable imaging system. Further, in each of the lens cross-sectional views, the left side is the object side and the right side is the image side.

Example 1

(1) Configuration of Optical System

FIG. 1 is a lens cross-sectional view of the configuration of the zoom lens of Example 1 according to the present invention. The zoom lens is composed of, in order from the object side, a first lens group G1 having positive refractive power, a second lens group G2 having negative refractive power, a third lens group G3 having positive refractive power, a fourth lens group G4 having negative refractive power, and a fifth lens group G5 having negative refractive power. In the zoom lens, changing focal length is performed by varying the distances between the lens groups.

In the zoom lens of Example 1, the third lens group G3 corresponds to the composite positive lens group of the present invention. In Example 1, the composite positive lens group is composed of the third lens group G3 only. Further, in the zoom lens of Example 1, the fourth lens group G4 and the fifth lens group G5 correspond to the negative A lens group and the negative B lens group of the present invention, respectively. The composite negative lens group is composed of these two lens groups. The aperture stop S is arranged at the object side of the fifth lens group G5.

During changing focal length from the wide angle end to the telephoto end in the zoom lens, the second lens group G2 is moved toward the image plane side and the third lens group G3 and the fourth lens group G4 are moved toward the object side while each drawing a locus projecting toward the image plane side, such that the distance between the first lens group G1 and the second lens group G2 is large, the distance between the second lens group G2 and the third lens group G3 is small, the distance between the third lens group G3 and the fourth lens group G4 is large, and the distance between the fourth lens group G4 and the fifth lens group G5 is large. Here, the first lens group G1 and the fifth lens group G5 are fixed with respect to the optical axis direction.

In the zoom lens, a biconvex lens having an eleventh surface and a twelfth surface is arranged at the most object side in the third lens group G3. The fourth lens group G4 is formed of a cemented lens (a lens unit) having an eighteenth surface, a nineteenth surface, and a twentieth surface (see Table 1). By being moved in the optical axis direction, the fourth lens group G4 is used as a focusing group for focusing to a proximity object. Moreover, a cemented lens having a twenty-fifth surface, a twenty-sixth surface, and a twenty-seventh surface and being included in the fifth lens group G5 is configured to be movable in the direction perpendicular to the optical axis. In the zoom lens, the cemented lens is used as the vibration-proof group. The vibration-proof group is moved in the direction perpendicular to the optical axis so as to move an image, so that so-called hand-shake correction can be performed.

In the drawing, "IMG" shown on the image plane side in the zoom lens denotes an image plane, and more specifically, denotes an imaging plane of an image sensor such as a CCD sensor or a CMOS sensor, a film surface of a silver halide film, or the like. The specific lens configuration of the lens groups is shown in FIG. 1. The reference characters denote the same components throughout the drawings showing the other examples, and thus, an explanation thereof is omitted hereinafter.

(2) Typical Numerical Values

Next, Typical numerical values 1 to which specific numerical values of the zoom lens are applied are described. Table 1 shows the lens data of the zoom lens. In Table 1, the "surface number" indicates the order of a lens surface from the object side, "r" indicates the curvature radius of a lens surface, "d" indicates a distance, on the optical axis, between the lens surfaces, "Nd" indicates the refractive index with respect to the d-line (wavelength λ=587.56 nm), and "vd" indicates the Abbe number with respect to the d-line (wavelength λ=587.60 nm). The aperture stop (stop S) is indicated by "STOP" written next to the corresponding surface number. In Table 1, "ΔPgF" indicates the deviation of the partial dispersion ratio of the glass material from a reference line, where a straight line passing through the coordinates of the partial dispersion ratios and Abbe number (vd) of the glass material C7 (partial dispersion ratio: 0.5393, vd: 60.49) and the glass material F2 (partial dispersion ratio: 0.5829, vd: 36.30) is defined as the reference line, and "H" indicates an optical effective diameter.

Table 2 shows F-numbers (Fno), half image viewing angles (ω), image heights (Y), and optical overall lengths (TL) of the zoom lens at the focal lengths (f) (the telephoto end, the intermediate focal length, the wide angle end). Table 3 shows variable intervals during changing focal length. Table 4 shows variable intervals at a time of focusing. The photographing distance during changing focal length was set to an infinity and the photographing distance at a time of focusing was set to the values shown in the table. Table 5 shows the surface numbers of surfaces included in the lens groups and the focal lengths of the lens groups. In the tables, the unit of all the numerical values related to lengths is "mm", and the unit of all the numerical values related to angles is "°".

Regarding the explanation about the tables, the same applies to the tables showing the other examples, and thus, an explanation thereof is omitted hereinafter.

Figure 2:
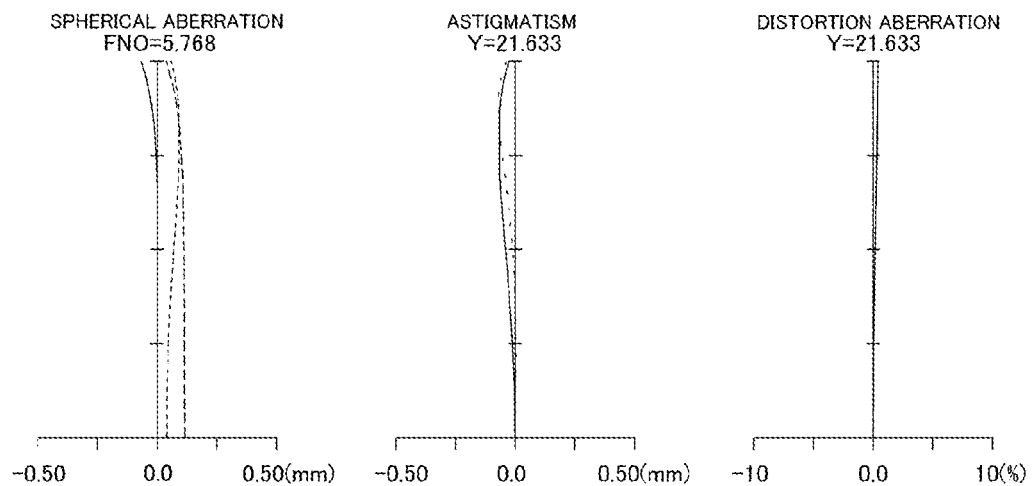
FIG. 2 shows a spherical aberration diagram, an astigmatism diagram, and a distortion aberration diagram of the zoom lens of Example 1 at a time of focusing to infinity at the wide angle end.
Figure 3:
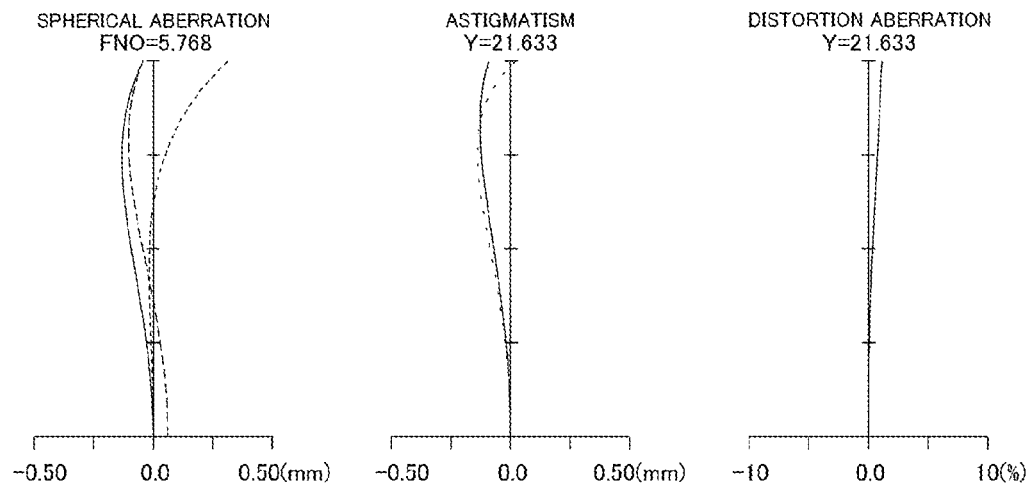
FIG. 3 shows a spherical aberration diagram, an astigmatism diagram, and a distortion aberration diagram of the zoom lens of Example 1 at a time of focusing to infinity at an intermediate focal length.
Figure 4:
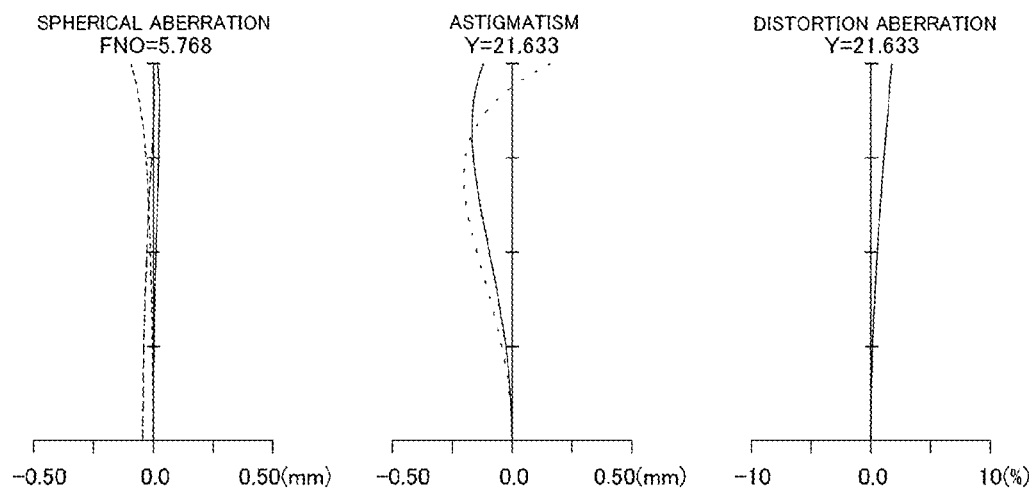
FIG. 4 shows a spherical aberration diagram, an astigmatism diagram, and a distortion aberration diagram of the zoom lens of Example 1 at a time of focusing to infinity at the telephoto end.

FIGS. 2 to 4 each show longitudinal aberration diagrams of the zoom lens at the wide angle end, the intermediate focal length, the telephoto end, at a time of focusing to infinity. The longitudinal aberration diagrams show, in order from the left side, spherical aberration, astigmatism, and distortion aberration, respectively. In each of the diagrams showing spherical aberration, the ordinate indicates the ratio to the full-aperture F-number (FNO), the abscissa indicates the defocus, the solid line indicates the d-line, the short broken line indicates the g-line, and the long broken line indicates the C-line (λ=656.28 nm). In each of the diagrams showing astigmatism, the ordinate indicates the image height (Y), the abscissa indicates the defocus, the solid line indicates the sagittal direction (X) of the d-line, and the broken line indicates the meridional direction (Y) of the d-line. In each of the diagram showing distortion aberration, the ordinate indicates the image height (Y) and the abscissa indicates %.

Figure 5:
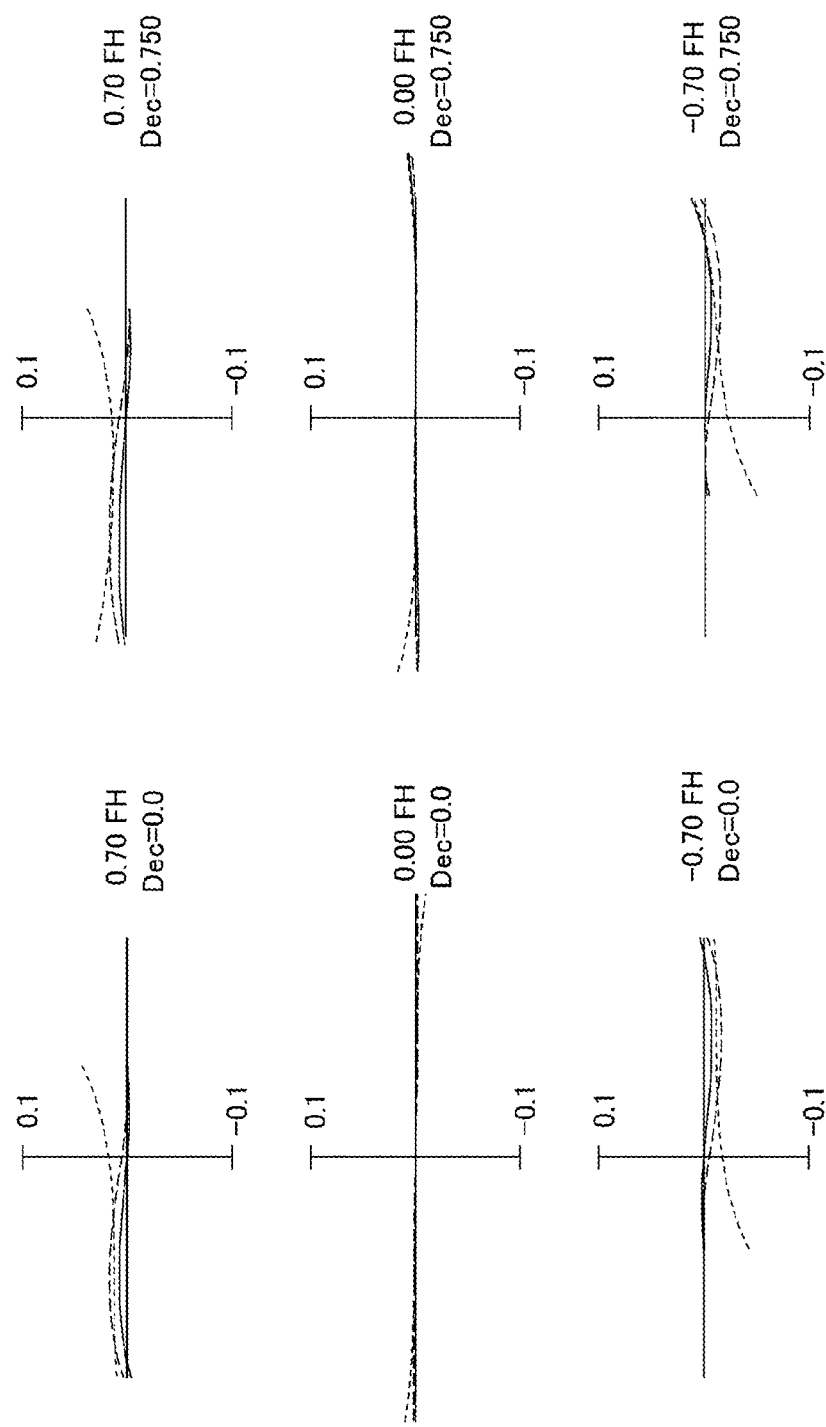
FIG. 5 shows lateral aberration diagrams of the zoom lens of Example 1 at a time of focusing to infinity at the telephoto end.

FIG. 5 shows lateral aberration diagrams of the zoom lens at the telephoto end in an infinity object focusing state. On the left side (Dec=0.0) in FIG. 5, lateral aberration in a basic state in which vibration-proof correction has not been performed is shown, the diagrams in the top line (0.70 FH) each show lateral aberration in an image point at 70% in terms of the maximum image height, the diagrams in the center line (0.00 FH) each show lateral aberration in an on-axis image point, and the diagrams in the bottom line (−0.70 FH) each show lateral aberration in an image point at −70% in terms of the maximum image height. On the right side (Dec=0.750) in FIG. 5, lateral aberration at a vibration-proof correction time (vibration-proof angle=0.154°) in which the vibration-proof group has been moved by 0.750 mm in the direction perpendicular to the optical axis is shown, the diagrams in the top line each show lateral aberration in an image point at 70% in terms of the maximum image height, the diagrams in the center line each show lateral aberration in an on-axis image point, and the diagrams in the bottom line each show lateral aberration in an image point at −70% in terms of the maximum image height. Throughout the diagrams, the abscissa indicates the distance, on the pupil surface, from a main ray, the solid line indicates a wavelength characteristic corresponding to the d-line, the short broken line indicates a wavelength characteristic corresponding to the g-line, and the long broken line indicates a wavelength characteristic corresponding to the C-line.

Since the order of indicating the aberration and what are indicated by a solid line, a broken line, etc. in each of the drawings are the same throughout the drawings showing the other examples, an explanation thereof is omitted hereinafter.

The numerical values of the conditional expression (1), the conditional expression (2), the conditional expression (5), and the conditional expression (7) to the conditional expression (14) are shown in Table 24. Regarding the values of the conditional expression (3), the conditional expression (4), and the conditional expression (6), see Table 1.

TABLE 1

| SURFACE NO. | r | d | Nd | vd | ΔPgF | H |
|---|---|---|---|---|---|---|
| 1 | 280.4148 | 3.000 | 1.80611 | 40.73 | −0.0078 | 42.500 |
| 2 | 110.7885 | 10.537 | 1.49700 | 81.61 | 0.0375 | 42.000 |
| 3 | −2999.6108 | 0.300 | | | | 42.000 |
| 4 | 114.0760 | 10.155 | 1.49700 | 81.61 | 0.0375 | 42.000 |
| 5 | −4460.5316 | D5 | | | | 41.700 |
| 6 | −6674.7083 | 2.000 | 1.72916 | 54.67 | | 16.400 |
| 7 | 54.7001 | 4.876 | | | | 15.900 |
| 8 | −57.6848 | 2.000 | 1.69680 | 55.46 | | 15.900 |
| 9 | 77.4198 | 4.239 | 1.84666 | 23.78 | | 16.700 |
| 10 | −329.5759 | D10 | | | | 16.900 |
| 11 | 149.1621 | 4.649 | 1.59282 | 68.62 | 0.0194 | 17.200 |
| 12 | −89.8170 | 0.300 | | | | 17.400 |
| 13 | 81.9796 | 4.437 | 1.49700 | 81.61 | 0.0375 | 17.400 |
| 14 | −190.0065 | 0.300 | | | | 17.300 |
| 15 | 51.9277 | 5.973 | 1.49700 | 81.61 | 0.0375 | 16.700 |
| 16 | −70.0945 | 1.800 | 1.84666 | 23.78 | | 16.400 |
| 17 | −504.5313 | D17 | | | | 16.000 |
| 18 | −157.8135 | 3.265 | 1.84666 | 23.78 | | 13.000 |
| 19 | −44.6655 | 1.000 | 1.74400 | 44.72 | | 12.700 |
| 20 | 72.4416 | D20 | | | | 12.100 |
| 21 | STOP INF | 10.907 | | | | 9.777 |
| 22 | 679.7501 | 1.000 | 1.92286 | 20.88 | | 8.400 |
| 23 | 28.2194 | 4.389 | 1.64769 | 33.84 | | 8.500 |
| 24 | −34.3733 | 1.000 | | | | 8.700 |
| 25 | 480.8903 | 3.839 | 1.72047 | 34.71 | | 9.400 |
| 26 | −21.7777 | 1.000 | 1.72916 | 54.67 | | 9.300 |
| 27 | 31.4475 | 3.145 | | | | 9.300 |
| 28 | 975.0376 | 4.679 | 1.60342 | 38.01 | | 9.200 |
| 29 | −17.9113 | 1.000 | 1.83481 | 42.72 | | 9.400 |
| 30 | 111.6078 | 0.300 | | | | 10.200 |
| 31 | 37.1016 | 4.389 | 1.62004 | 36.30 | | 10.800 |
| 32 | −74.8487 | 16.468 | | | | 11.000 |
| 33 | 31.2209 | 5.547 | 1.62004 | 36.30 | | 13.100 |
| 34 | −123.0101 | 1.500 | 1.95375 | 32.32 | | 12.900 |
| 35 | 81.3637 | 6.939 | | | | 12.700 |
| 36 | −28.4722 | 1.500 | 1.95375 | 32.32 | | 12.700 |
| 37 | −56.4443 | 31.487 | | | | 13.400 |
| 38 | INF | 2.500 | 1.51680 | 64.20 | | 21.600 |
| 39 | INF | 1.000 | | | | 21.600 |

TABLE 2

| f | 153.714 | 272.696 | 487.441 |
|---|---|---|---|
| Fno | 5.768 | 5.768 | 5.768 |
| ω | 7.985 | 4.491 | 2.497 |
| Y | 21.633 | 21.633 | 21.633 |
| TL | 310.000 | 310.000 | 310.000 |

TABLE 3

| f | 153.714 | 272.696 | 487.441 |
|---|---|---|---|
| PHOTOGRAPHING DISTANCE | INF | INF | INF |
| D5 | 67.301 | 98.446 | 122.526 |
| D10 | 59.143 | 29.356 | 1.000 |
| D17 | 5.714 | 9.807 | 8.569 |
| D20 | 17.273 | 11.822 | 17.335 |

TABLE 4

| f | 153.714 | 272.696 | 487.441 |
|---|---|---|---|
| PHOTOGRAPHING DISTANCE | 1698.27 | 1698.27 | 1698.27 |
| D17 | 7.046 | 14.273 | 22.905 |
| D20 | 15.941 | 7.356 | 3.000 |

TABLE 5

| GROUP | SURFACE NO. | FOCAL LENGTH |
|---|---|---|
| G1 | 1-5 | 212.647 |
| G2 | 6-10 | −47.101 |
| G3 | 11-17 | 39.878 |
| G4 | 18-20 | −74.458 |
| G5 | 21-37 | −69.098 |

Example 2

(1) Configuration of Optical System

Figure 6:
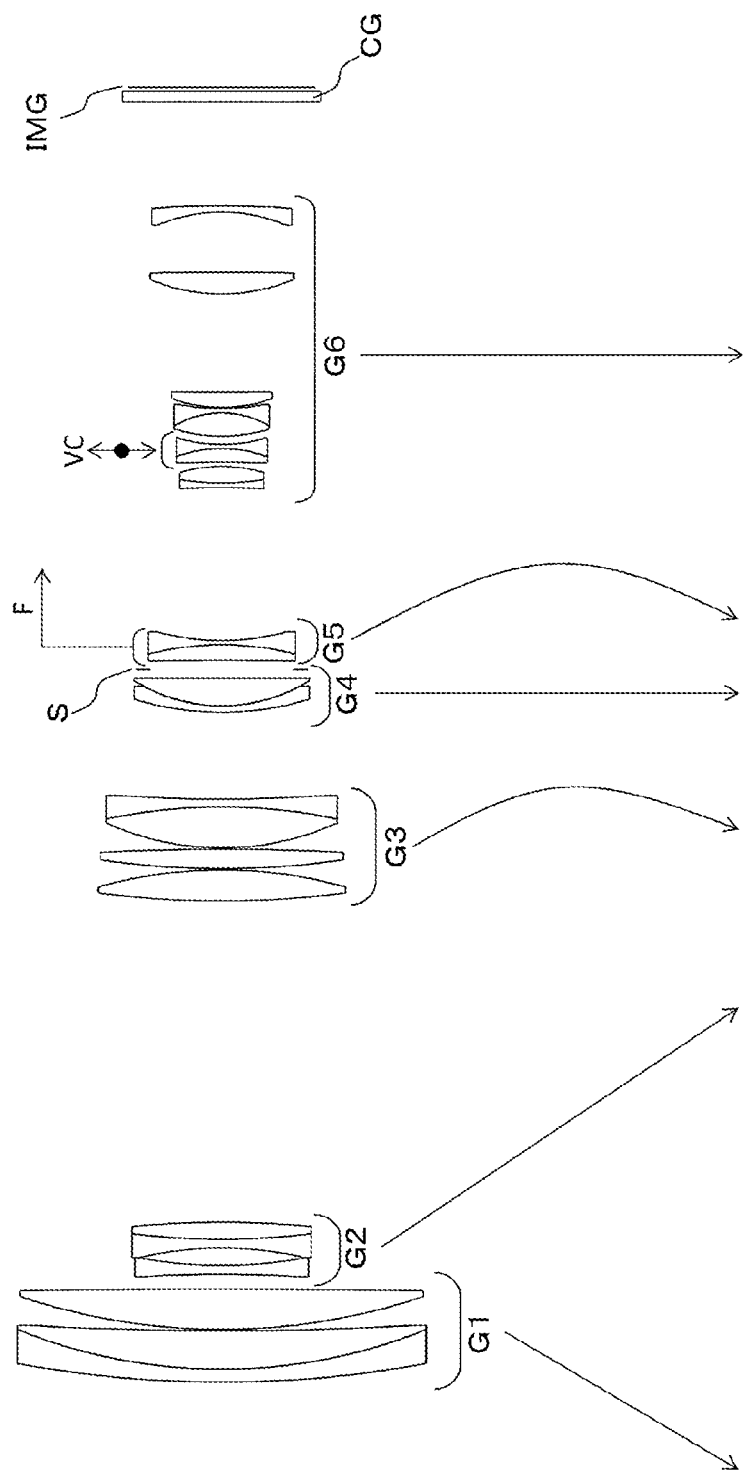
FIG. 6 is a cross-sectional view of a lens configuration example of a zoom lens of Example 2 of the present invention at a time of focusing to infinity at the wide angle end.

FIG. 6 is a lens cross-sectional view of a configuration of the zoom lens of Example 2 according to the present invention. The zoom lens is composed of, in order from the object side, the first lens group G1 having positive refractive power, the second lens group G2 having negative refractive power, the third lens group G3 having positive refractive power, the fourth lens group G4 having positive refractive power, the fifth lens group G5 having negative refractive power, and the sixth lens group G6 having negative refractive power. Changing focal length is performed by varying the distances between the lens groups.

In the zoom lens of Example 2, the third lens group G3 and the fourth lens group G4 form the composite positive lens group of the present invention. Moreover, in the zoom lens of Example 2, the fifth lens group G5 and the sixth lens group G6 correspond to the negative A lens group and the negative B lens group of the present invention, respectively, and the composite negative lens group is composed of these two lens groups. The aperture stop S is arranged at the image plane side of the fourth lens group G4.

In the zoom lens, during changing focal length is performed from the wide angle end to the telephoto end, the first lens group is moved toward the object side, the second lens group G2 is moved toward the image plane side, and the third lens group G3 and the fifth lens group G5 are moved toward the image plane side while each drawing a locus projecting to the image plane side, such that the distance between the first lens group G1 and the second lens group G2 is large, the distance between the second lens group G2 and the third lens group G3 is small, the distance between the third lens group G3 and the fourth lens group G4 is small, the distance between the distance between the fourth lens group G4 and the fifth lens group G5 is large, and the distance between the fifth lens group G5 and the sixth lens group G6 is small. Here, the fourth lens group G4 and the sixth lens group G6 are fixed with respect to the optical axis direction.

In the zoom lens, a biconvex lens having an eleventh surface and a twelfth surface is arranged at the most object side in the third lens group. The fifth lens group G5 is formed of a cemented lens (a lens unit) having a twenty-second surface, a twenty-third surface, and a twenty-fourth surface (see Table 6). By being moved in the optical axis direction, the fifth lens group G5 is used as a focusing group for focusing to a proximity object. Moreover, a cemented lens having a twenty-eighth surface, a twenty-ninth surface, and a thirtieth surface and being included in the sixth lens group G6 is configured to be movable in the direction perpendicular to the optical axis. In the zoom lens, the cemented lens is used as the vibration-proof group. The vibration-proof group is moved in the direction perpendicular to the optical axis so as to move an image, so that so-called hand-shake correction can be performed.

(2) Typical Numerical Values

Next, Typical numerical values 2 to which specific numerical values of the zoom lens were applied are described. Table 6 shows the lens data of the zoom lens. Table 7 shows F-numbers (Fno), half image viewing angles (ω), image heights (Y), and optical overall lengths (TL) of the zoom lens at the focal lengths (f). Table 8 shows a variable interval during changing focal length. Table 9 shows a variable interval at a time of focusing. Table 10 shows the diameter of the aperture stop at each focal length. Table 11 shows the surface numbers of surfaces included in the lens groups and the focal lengths of the lens groups. The numerical values of the conditional expression (1), the conditional expression (2), the conditional expression (5), and the conditional expression (7) to the conditional expression (14) are shown in Table 24. Regarding the numerical values of the conditional expression (3), the conditional expression (4), and the conditional expression (6), see Table 6.

Figure 7:
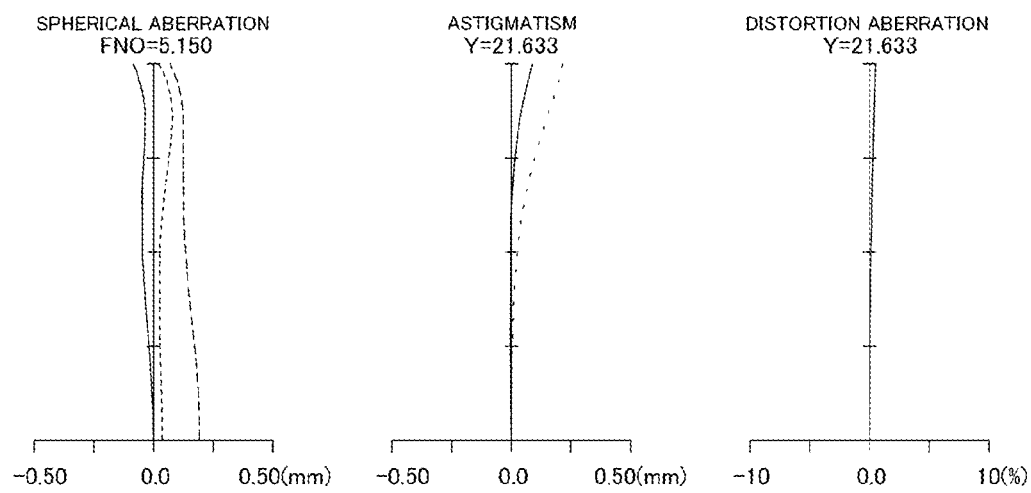
FIG. 7 shows a spherical aberration diagram, an astigmatism diagram, and a distortion aberration diagram of the zoom lens of Example 2 at a time of focusing to infinity at the wide angle end.
Figure 8:
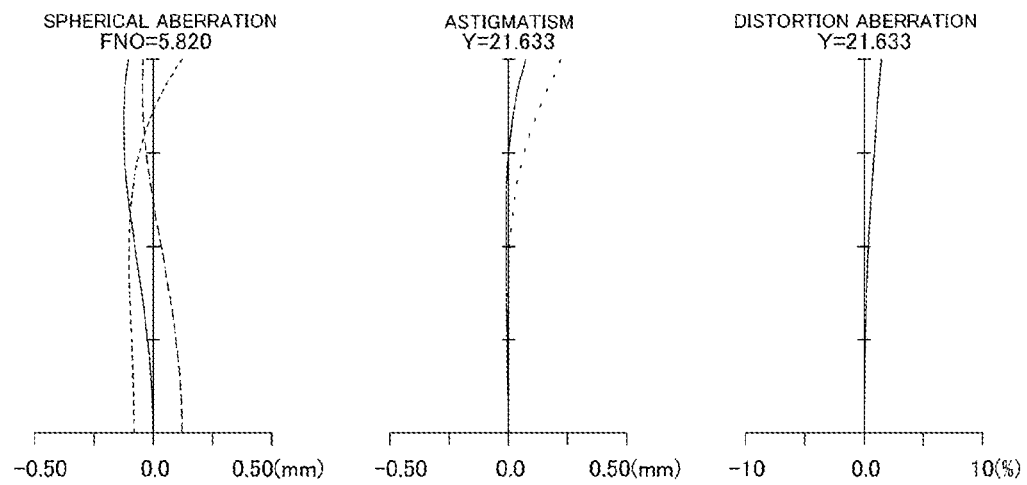
FIG. 8 shows a spherical aberration diagram, an astigmatism diagram, and a distortion aberration diagram of the zoom lens of Example 2 at a time of focusing to infinity at an intermediate focal length.
Figure 9:
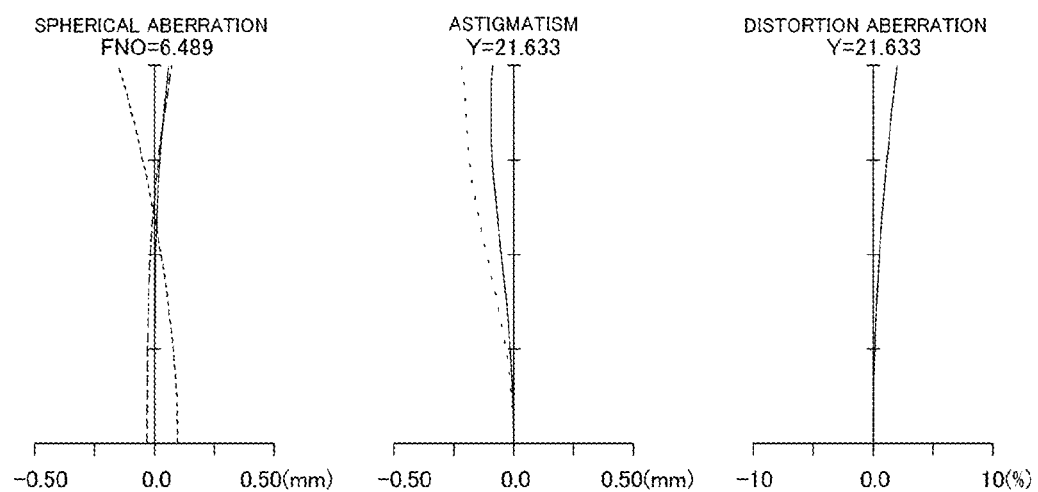
FIG. 9 shows a spherical aberration diagram, an astigmatism diagram, and a distortion aberration diagram of the zoom lens of Example 2 at a time of focusing to infinity at the telephoto end.
Figure 10:
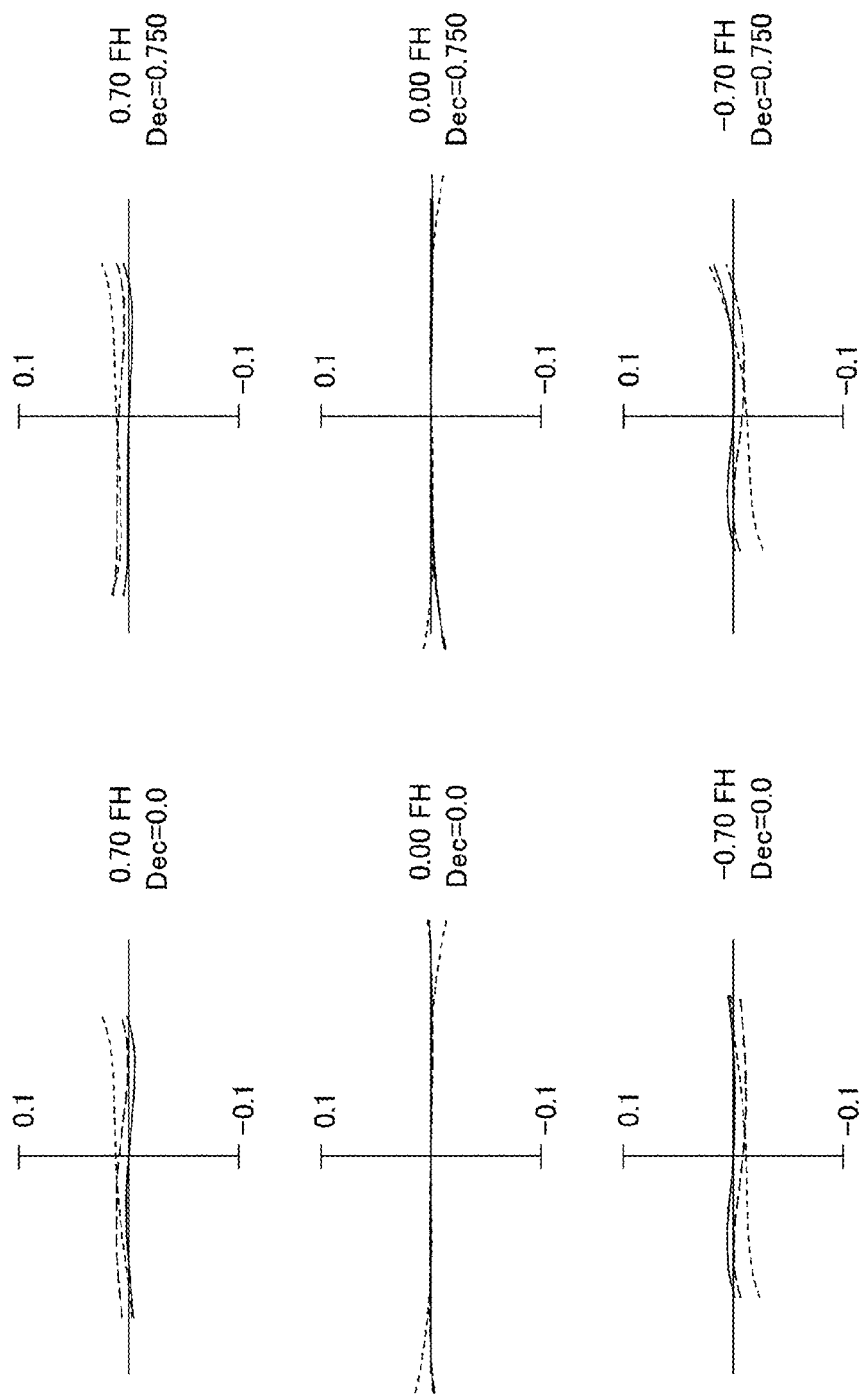
FIG. 10 shows lateral aberration diagrams of the zoom lens of Example 2 at a time of focusing to infinity at the telephoto end.

FIGS. 7 to 9 each show longitudinal aberration diagrams at the wide angle end, the intermediate focal length, and the telephoto end of the zoom lens at a time of focusing to infinity. FIG. 10 shows lateral aberration diagrams of the zoom lens.

TABLE 6

| SURFACE NO. | r | d | Nd | vd | ΔPgF | H |
|---|---|---|---|---|---|---|
| 1 | 256.5497 | 3.000 | 1.80611 | 40.73 | −0.0078 | 45.000 |
| 2 | 124.5062 | 8.940 | 1.49700 | 81.61 | 0.0375 | 44.500 |
| 3 | 783.4998 | 0.300 | | | | 44.400 |

TABLE 6-continued

| SURFACE NO. | r | d | Nd | vd | ΔPgF | H |
|---|---|---|---|---|---|---|
| 4 | 144.4673 | 9.355 | 1.49700 | 81.61 | 0.0375 | 44.400 |
| 5 | −2668.0460 | D5 | | | | 44.200 |
| 6 | −261.2284 | 2.000 | 1.72916 | 54.67 | | 18.700 |
| 7 | 102.7619 | 4.067 | | | | 18.400 |
| 8 | −81.6283 | 2.000 | 1.72916 | 54.67 | | 18.400 |
| 9 | 161.8564 | 3.979 | 1.84666 | 23.78 | | 19.000 |
| 10 | −217.0615 | D10 | | | | 19.200 |
| 11 | 213.6568 | 7.240 | 1.59282 | 68.62 | 0.0194 | 26.900 |
| 12 | −103.7383 | 0.300 | | | | 27.000 |
| 13 | 191.5233 | 4.516 | 1.49700 | 81.61 | 0.0375 | 26.500 |
| 14 | −500.0000 | 0.300 | | | | 26.200 |
| 15 | 63.9340 | 9.533 | 1.49700 | 81.61 | 0.0375 | 25.100 |
| 16 | −125.6879 | 1.800 | 1.90366 | 31.31 | | 24.600 |
| 17 | 341.1838 | D17 | | | | 23.800 |
| 18 | 68.7163 | 1.500 | 1.84666 | 23.78 | | 18.600 |
| 19 | 37.7184 | 6.375 | 1.62004 | 36.30 | | 17.700 |
| 20 | 8924.3686 | 2.017 | | | | 17.300 |
| 21 STOP | INF | D21 | | | | VARIABLE |
| 22 | −822.1021 | 3.620 | 1.84666 | 23.78 | | 15.800 |
| 23 | −67.5322 | 1.000 | 1.74400 | 44.90 | | 15.400 |
| 24 | 55.2443 | D24 | | | | 14.400 |
| 25 | −120.9184 | 1.000 | 1.92286 | 20.88 | | 8.900 |
| 26 | 52.9129 | 3.872 | 1.64769 | 33.84 | | 8.800 |
| 27 | −33.6359 | 1.006 | | | | 8.700 |
| 28 | −260.4458 | 3.114 | 1.72825 | 28.32 | | 8.800 |
| 29 | −31.1805 | 1.000 | 1.72916 | 54.67 | | 8.800 |
| 30 | 35.2348 | 1.937 | | | | 8.900 |
| 31 | 37.1706 | 5.389 | 1.62004 | 36.30 | | 9.400 |
| 32 | −21.3502 | 1.000 | 1.89190 | 37.13 | | 9.500 |
| 33 | 49.3011 | 0.300 | | | | 9.900 |
| 34 | 34.1759 | 3.514 | 1.62004 | 36.30 | | 10.300 |
| 35 | 927.5071 | 22.839 | | | | 10.500 |
| 36 | 42.0618 | 5.075 | 1.62004 | 36.30 | | 15.400 |
| 37 | −614.7783 | 13.959 | | | | 15.300 |
| 38 | −37.4789 | 1.500 | 1.95375 | 32.32 | | 14.400 |
| 39 | −208.7708 | 24.035 | | | | 15.000 |
| 40 | INF | 2.500 | 1.51680 | 64.20 | | 21.600 |
| 41 | INF | 1.000 | | | | 21.600 |

TABLE 7

| f | 154.326 | 299.822 | 582.562 |
|---|---|---|---|
| Fno | 5.150 | 5.820 | 6.489 |
| ω | 7.949 | 4.073 | 2.084 |
| Y | 21.633 | 21.633 | 21.633 |
| TL | 300.000 | 327.144 | 365.938 |

TABLE 8

| f | 154.326 | 299.822 | 582.562 |
|---|---|---|---|
| PHOTOGRAPHING DISTANCE | INF | INF | INF |
| D5 | 3.468 | 90.719 | 153.164 |
| D10 | 74.585 | 28.430 | 1.000 |
| D17 | 20.198 | 6.247 | 10.025 |
| D21 | 2.152 | 15.808 | 4.234 |
| D24 | 35.565 | 21.908 | 33.483 |

TABLE 9

| f | 154.326 | 299.822 | 582.562 |
|---|---|---|---|
| PHOTOGRAPHING DISTANCE | 1900.00 | 1872.86 | 1834.06 |
| D21 | 3.317 | 21.185 | 21.706 |
| D24 | 34.399 | 16.532 | 16.010 |

TABLE 10

| f | 154.326 | 299.822 | 582.562 |
|---|---|---|---|
| APERTURE STOP DIAMETER | 32.945 | 32.831 | 26.519 |

TABLE 11

| GROUP | SURFACE NO. | FOCAL LENGTH |
|---|---|---|
| G1 | 1-5 | 275.266 |
| G2 | 6-10 | −70.694 |
| G3 | 11-17 | 69.085 |
| G4 | 18-21 | 158.581 |
| G5 | 22-24 | −76.938 |
| G6 | 25-39 | −57.819 |

Example 3

(1) Configuration of Optical System

Figure 11:
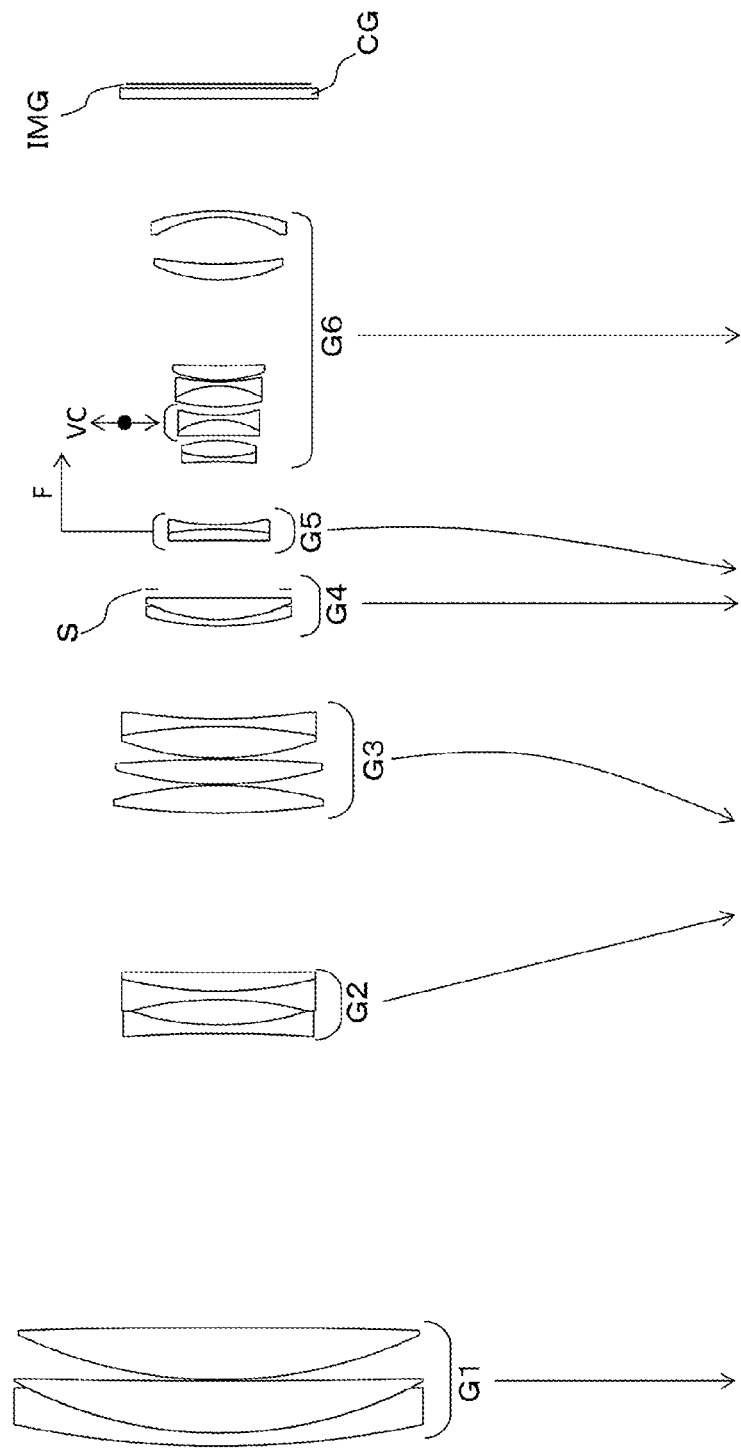
FIG. 11 is a cross-sectional view of the lens configuration example of a zoom lens of Example 3 of the present invention at a time of focusing to infinity at the wide angle end.

FIG. 11 is a lens cross-sectional view of the zoom lens of Example 3 according to the present invention. The zoom lens is composed of, in order from the object side, the first lens group G1 having positive refractive power, the second lens group G2 having negative refractive power, the third lens group G3 having positive refractive power, the fourth lens group G4 having positive refractive power, the fifth lens group G5 having negative refractive power, and the sixth lens group G6 having negative refractive power. In the zoom lens, changing focal length is performed by varying the distances between the lens groups.

In the zoom lens of Example 3, the third lens group G3 and the fourth lens group G4 form the composite positive lens group of the present invention. Moreover, in the zoom lens of Example 3, the fifth lens group G5 and the sixth lens group G6 correspond to the negative A lens group and the negative B lens group of the present invention, respectively, and the composite negative lens group is composed of these two lens groups. The aperture stop S is arranged at the image plane side of the fourth lens group G4.

In the zoom lens, during changing focal length is performed from the wide angle end to the telephoto end, the second lens group G2 is moved toward the image plane side, and the third lens group G3 and the fifth lens group G5 are moved toward the object side while each drawing a locus projecting to the image plane side, such that the distance between the first lens group G1 and the second lens group G2 is large, the distance between the second lens group G2 and the third lens group G3 is small, the distance between the third lens group G3 and the fourth lens group G4 is large, the distance between the fourth lens group G4 and the fifth lens group G5 is small, and the distance between the fifth lens group G5 and the sixth lens group G6 is large. Here, the first lens group G1, the fourth lens group G4, and the sixth lens group G6 are fixed with respect to the optical axis direction.

In the zoom lens, a biconvex lens having an eleventh surface and a twelfth surface is arranged at the most object side in the third lens group. The fifth lens group G5 is formed of a cemented lens (a lens unit) having a twenty-second surface, a twenty-third surface, and a twenty-fourth surface (see Table 12). By being moved in the optical axis direction, the fifth lens group G5 is used as a focusing group for focusing to a proximity object. Moreover, a cemented lens having a twenty-eighth surface, a twenty-ninth surface, and a thirtieth surface and being included in the sixth lens group G6 is configured to be movable in the direction perpendicular to the optical axis. In the zoom lens, the cemented lens is used as the vibration-proof group. The vibration-proof group is moved in the direction perpendicular to the optical axis so as to move an image, so that so-called hand-shake correction can be performed.

(2) Typical Numerical Values

Next, Typical numerical values 3 to which specific numerical values of the zoom lens were applied are described. Table 12 shows the lens data of the zoom lens. Table 13 shows F-numbers (Fno), half image viewing angles ($\omega$), image heights (Y), and optical overall lengths (TL) of the zoom lens at the focal lengths (f). Table 14 shows variable intervals during changing focal length. Table 15 shows variable intervals at a time of focusing. Table 16 shows the diameter of the aperture stop at each focal length. Table 17 shows the surface numbers of surfaces included in the lens groups and the focal lengths of the lens groups. The numerical values of the conditional expression (1), the conditional expression (2), the conditional expression (5), and the conditional expression (7) to the conditional expression (14) are shown in Table 24. Regarding the values related to the conditional expression (3), the conditional expression (4), and the conditional expression (6), see Table 12.

Figure 12:
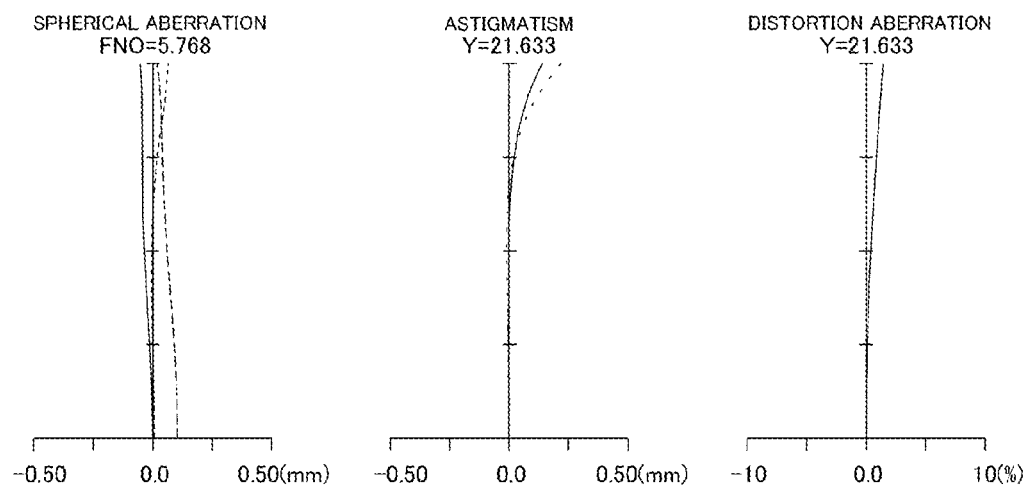
FIG. 12 shows a spherical aberration diagram, an astigmatism diagram, and a distortion aberration diagram of the zoom lens of Example 3 at a time of focusing to infinity at the wide angle end.
Figure 13:
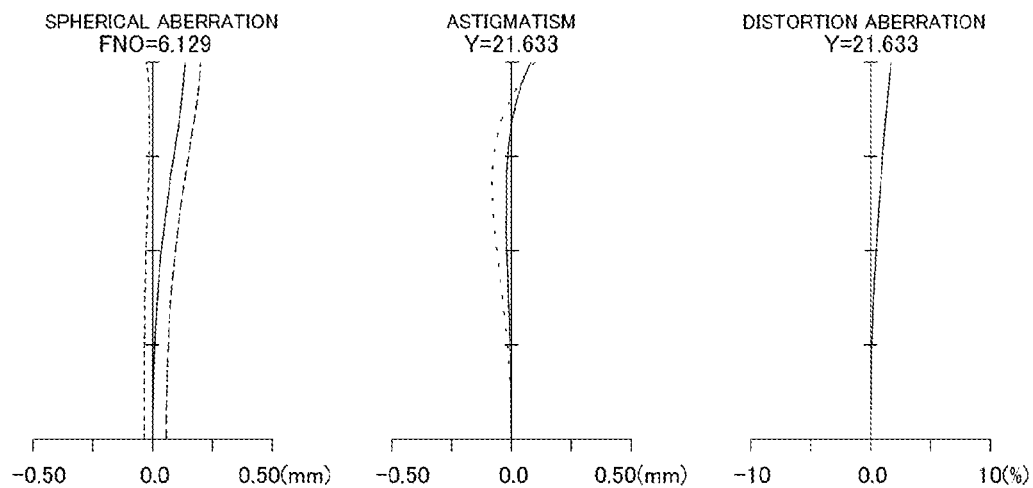
FIG. 13 shows a spherical aberration diagram, an astigmatism diagram, and a distortion aberration diagram of the zoom lens of Example 3 at a time of focusing to infinity at an intermediate focal length.
Figure 14:
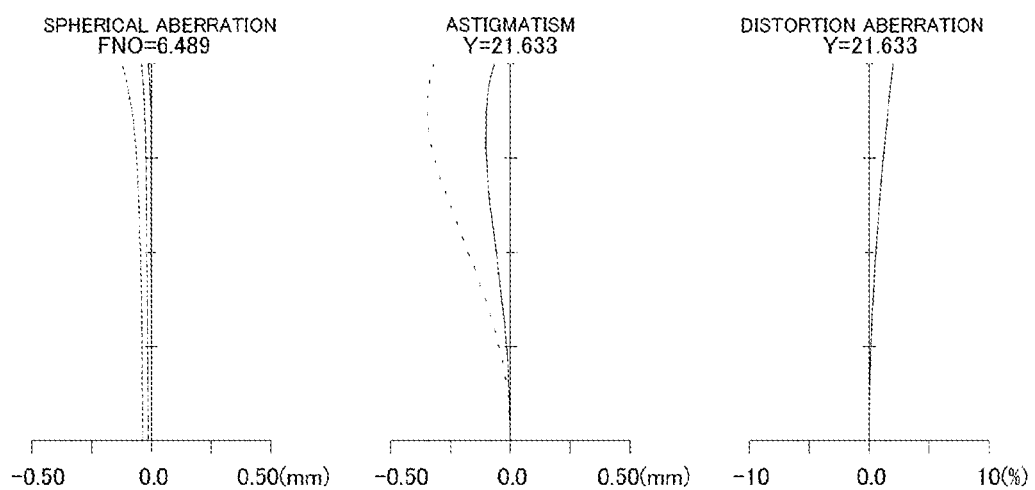
FIG. 14 shows a spherical aberration diagram, an astigmatism diagram, and a distortion aberration diagram of the zoom lens of Example 3 at a time of focusing to infinity at the telephoto end.
Figure 15:
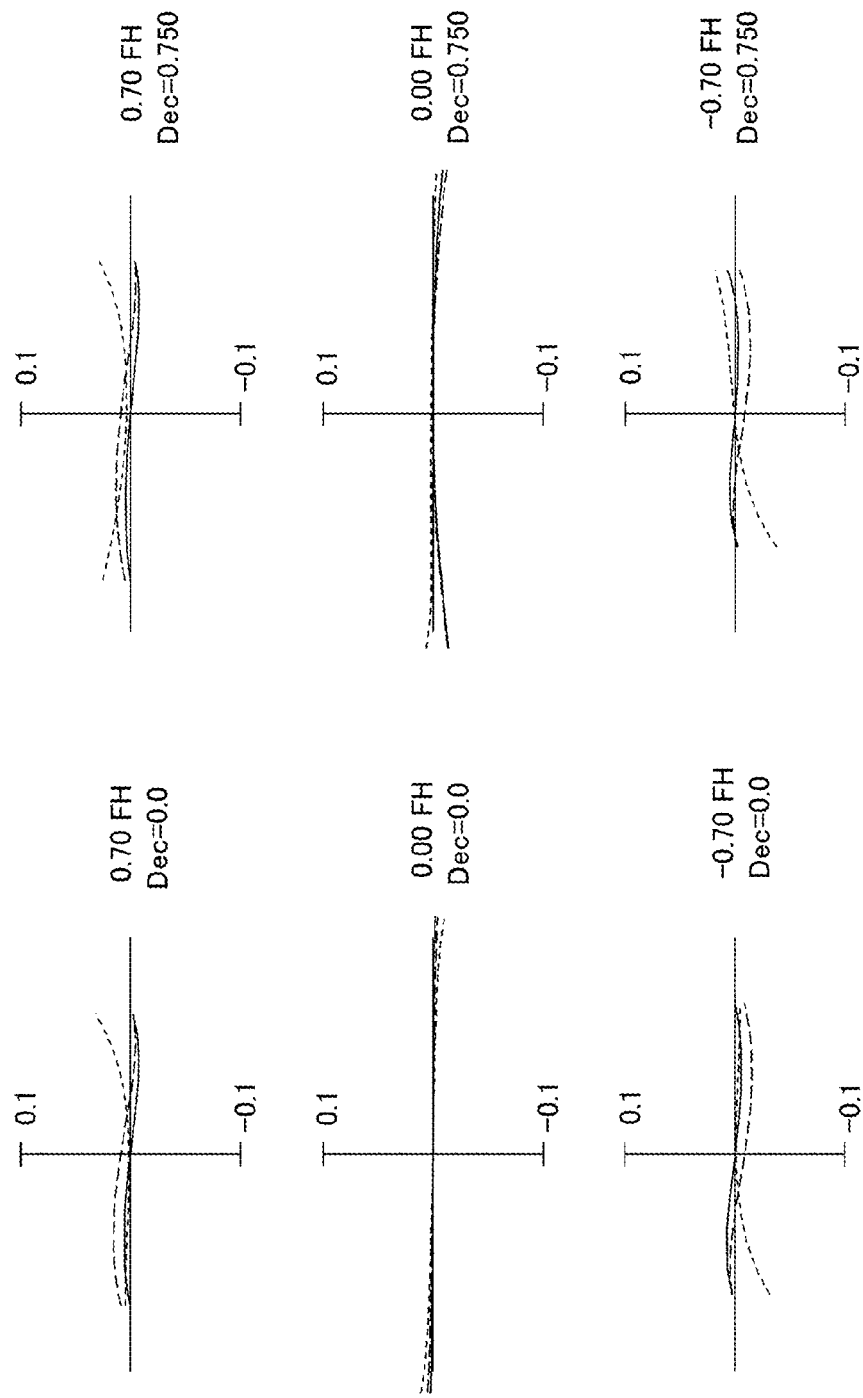
FIG. 15 shows lateral aberration diagrams of the zoom lens of Example 3 at a time of focusing to infinity at the telephoto end.

FIGS. 12 to 14 each show longitudinal aberration diagrams of the zoom lens at the wide angle end, the intermediate focal length, and the telephoto end at a time of focusing to infinity. FIG. 15 shows lateral aberration diagrams of the zoom lens.

TABLE 12

| SURFACE NO. | | r | d | Nd | vd | ΔPgF | H |
|---|---|---|---|---|---|---|---|
| 1 | | 224.0638 | 3.000 | 1.80611 | 40.73 | −0.0078 | 45.000 |
| 2 | | 97.8876 | 12.047 | 1.49700 | 81.61 | 0.0375 | 44.200 |
| 3 | | 2010.1420 | 0.300 | | | | 44.200 |
| 4 | | 107.2356 | 12.114 | 1.49700 | 81.61 | 0.0375 | 44.100 |
| 5 | | −1562.7396 | D5 | | | | 43.800 |
| 6 | | −322.4481 | 2.000 | 1.72916 | 54.67 | | 20.600 |
| 7 | | 66.5760 | 5.906 | | | | 20.000 |
| 8 | | −79.0361 | 2.000 | 1.53775 | 74.70 | 0.0255 | 20.000 |
| 9 | | 89.7454 | 4.279 | 1.84666 | 23.78 | | 20.800 |
| 10 | | 1411.1732 | D10 | | | | 20.900 |
| 11 | | 173.9808 | 6.367 | 1.49700 | 81.61 | 0.0375 | 22.600 |
| 12 | | −89.7756 | 0.300 | | | | 22.700 |
| 13 | | 86.4438 | 5.787 | 1.49700 | 81.61 | 0.0375 | 22.400 |
| 14 | | −283.5888 | 0.300 | | | | 22.100 |
| 15 | | 64.8192 | 7.301 | 1.49700 | 81.61 | 0.0375 | 21.000 |
| 16 | | −116.5409 | 1.800 | 1.89190 | 37.13 | | 20.500 |
| 17 | | 135.7988 | D17 | | | | 19.700 |
| 18 | | 64.0458 | 1.500 | 1.84666 | 23.78 | | 15.600 |
| 19 | | 37.8489 | 5.033 | 1.62004 | 36.30 | | 15.000 |
| 20 | | 2061.0242 | 2.052 | | | | 14.600 |
| 21 | STOP | INF | D21 | | | | VARIABLE |
| 22 | | −839.1256 | 2.638 | 1.84666 | 23.78 | | 10.700 |
| 23 | | −74.8969 | 1.000 | 1.72916 | 54.67 | | 10.400 |
| 24 | | 49.7222 | D24 | | | | 10.000 |
| 25 | | −137.5818 | 1.000 | 1.92286 | 20.88 | | 7.700 |
| 26 | | 30.8152 | 3.930 | 1.64769 | 33.84 | | 7.600 |
| 27 | | −29.2245 | 1.109 | | | | 7.600 |
| 28 | | −305.8806 | 3.693 | 1.72047 | 34.71 | | 7.700 |
| 29 | | −17.4192 | 1.000 | 1.72916 | 54.67 | | 7.700 |
| 30 | | 33.4726 | 1.990 | | | | 7.900 |
| 31 | | 37.5436 | 4.852 | 1.60342 | 38.01 | | 8.400 |
| 32 | | −19.7172 | 1.000 | 1.83481 | 42.72 | | 8.500 |
| 33 | | 46.4857 | 0.300 | | | | 9.000 |
| 34 | | 28.1946 | 3.400 | 1.59270 | 35.45 | | 9.400 |
| 35 | | 236.6030 | 19.954 | | | | 9.600 |
| 36 | | 34.5155 | 3.745 | 1.58144 | 40.89 | | 13.700 |

TABLE 12-continued

| SURFACE NO. | r | d | Nd | vd | ΔPgF | H |
|---|---|---|---|---|---|---|
| 37 | 87.3136 | 10.762 | | | | 13.600 |
| 38 | −27.4153 | 1.500 | 1.95375 | 32.32 | | 13.600 |
| 39 | −47.5046 | 26.001 | | | | 14.400 |
| 40 | INF | 2.500 | 1.51680 | 64.20 | | 21.600 |
| 41 | INF | 1.000 | | | | 21.600 |

TABLE 13

| f | 308.675 | 424.019 | 582.642 |
|---|---|---|---|
| Fno | 5.768 | 6.129 | 6.489 |
| ω | 3.954 | 2.870 | 2.084 |
| Y | 21.633 | 21.633 | 21.633 |
| TL | 315.500 | 315.500 | 315.500 |

TABLE 14

| f | 308.675 | 424.019 | 582.642 |
|---|---|---|---|
| PHOTOGRAPHING DISTANCE | INF | INF | INF |
| D5 | 68.235 | 85.837 | 97.738 |
| D10 | 37.096 | 19.426 | 1.000 |
| D17 | 21.564 | 21.633 | 28.158 |
| D21 | 11.330 | 9.457 | 2.067 |
| D24 | 14.666 | 16.539 | 23.929 |

TABLE 15

| f | 308.675 | 424.019 | 582.642 |
|---|---|---|---|
| PHOTOGRAPHING DISTANCE | 1884.50 | 1884.50 | 1884.50 |
| D21 | 16.988 | 19.996 | 20.316 |
| D24 | 9.008 | 6.000 | 5.681 |

TABLE 16

| f | 308.675 | 424.019 | 582.642 |
|---|---|---|---|
| APERTURE STOP DIAMETER | 27.967 | 25.785 | 22.491 |

TABLE 17

| GROUP | SURFACE NO. | FOCAL LENGTH |
|---|---|---|
| G1 | 1-5 | 195.848 |
| G2 | 6-10 | −57.237 |
| G3 | 11-17 | 67.888 |
| G4 | 18-21 | 142.743 |
| G5 | 22-24 | −70.827 |
| G6 | 25-39 | −58.297 |

Example 4

(1) Configuration of Optical System

Figure 16:
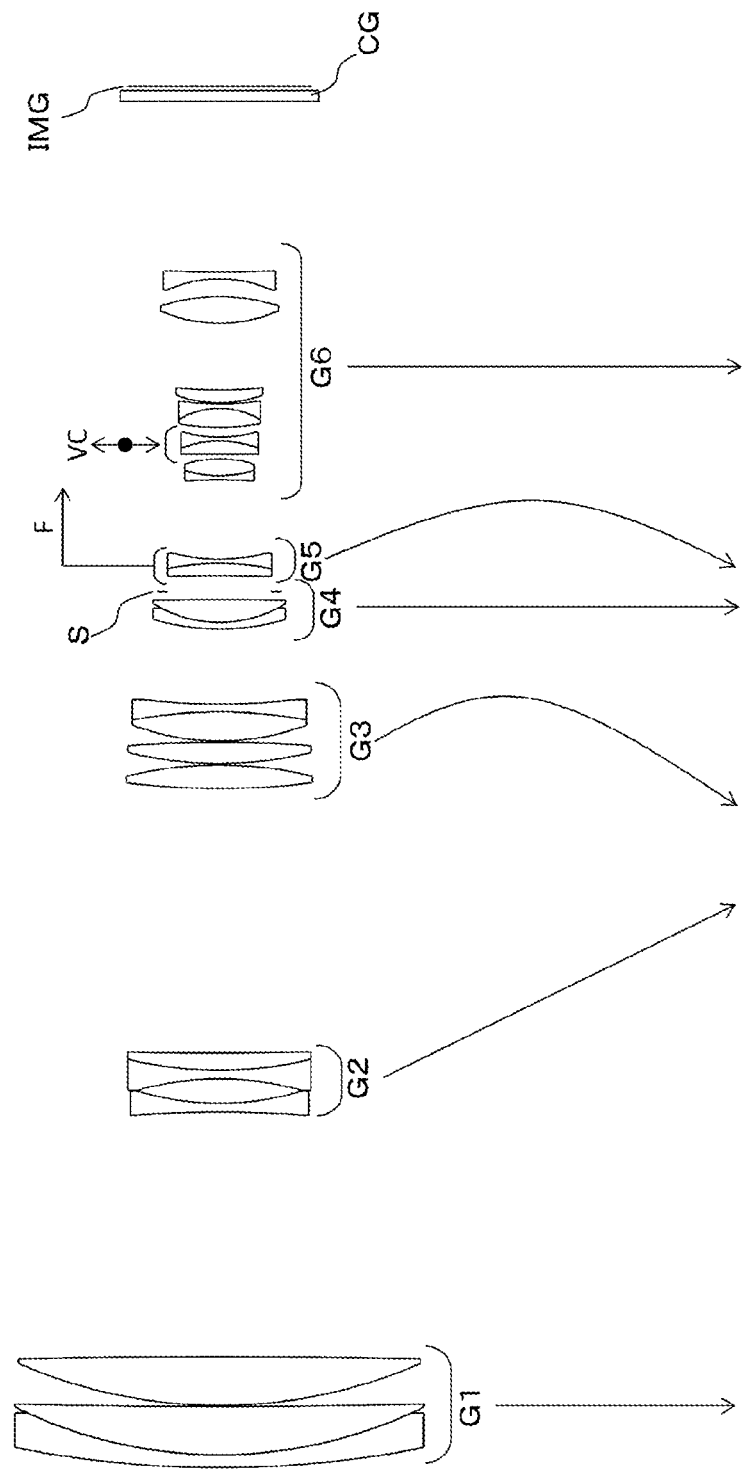
FIG. 16 is a cross-sectional view of the lens configuration example of a zoom lens of Example 4 of the present invention at a time of focusing to infinity at the wide angle end.

FIG. 16 is a lens cross-sectional view of the zoom lens of Example 4 according to the present invention. The zoom lens is composed of, in order from the object side, the first lens group G1 having positive refractive power, the second lens group G2 having negative refractive power, the third lens group G3 having positive refractive power, the fourth lens group G4 having positive refractive power, the fifth lens group G5 having negative refractive power, and the sixth lens group G6 having negative refractive power. In the zoom lens, changing focal length is performed by varying the distances between the lens groups.

In the zoom lens of Example 4, the third lens group G3 and the fourth lens group G4 form the composite positive lens group of the present invention. Moreover, in the zoom lens of Example 4, the fifth lens group G5 and the sixth lens group G6 are the negative A lens group and the negative B lens group of the present invention, respectively, and the composite negative lens group is composed of these two lens groups. The aperture stop S is arranged at the image plane side of the fourth lens group G4.

In the zoom lens, during changing focal length is performed from the wide angle end to the telephoto end, the second lens group G2 is moved toward the image plane side and the third lens group G3 and the fifth lens group G5 are moved toward the object side while each drawing a locus projecting to the image plane side, such that the distance between the first lens group G1 and the second lens group G2 is large, the distance between the second lens group G2 and the third lens group G3 is small, the distance between the third lens group G3 and the fourth lens group G4 is large, the distance between the fourth lens group G4 and the fifth lens group G5 is small, and the distance between the fifth lens group G5 and the sixth lens group G6 is large. Here, the first lens group G1, the fourth lens group G4, and the sixth lens group G6 are fixed with respect to the optical axis direction.

In the zoom lens, a biconvex lens having an eleventh surface and a twelfth surface is arranged at the most object side in the third lens group. The fifth lens group G5 is formed of a cemented lens (a lens unit) having a twenty-second surface, a twenty-third surface, and a twenty-fourth surface (see Table 18). By being moved in the optical axis direction, the fifth lens group G5 is used as a focusing group for focusing to a proximity object. Moreover, a cemented lens having a twenty-eighth surface, a twenty-ninth surface, and a thirtieth surface and being included in the sixth lens group G6 is configured to be movable in the direction perpendicular to the optical axis. In the zoom lens, the cemented lens is used as the vibration-proof group. The vibration-proof group is moved in the direction perpendicular to the optical axis so as to move an image, so that so-called hand-shake correction can be performed.

(2) Typical Numerical Values

Next, Typical numerical values 4 to which specific numerical values of the zoom lens were applied are described. Table 18 shows the lens data of the zoom lens. Table 19 shows F-numbers (Fno), half viewing angles (ω), image heights (Y), and optical overall lengths (TL) of the zoom lens at the focal lengths (f). Table 20 shows variable intervals during changing focal length. Table 21 shows variable intervals at a time of focusing. Table 22 shows the diameter of the aperture stop at each focal length. Table 23 shows the surface numbers of surfaces included in the lens groups and the focal lengths of the lens groups. The numerical values of the conditional expression (1), the conditional expression (2), the conditional expression (5), and the conditional expression (7) to the conditional expression (14) are shown in Table 24. Regarding the values related to the conditional expression (3), the conditional expression (4), and the conditional expression (6), see Table 18.

Figure 17:
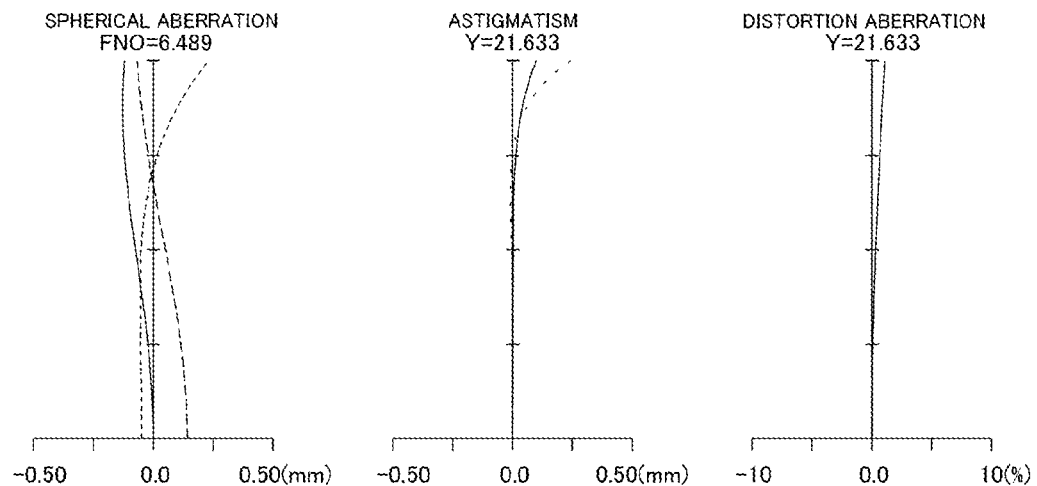
FIG. 17 shows a spherical aberration diagram, an astigmatism diagram, and a distortion aberration diagram of the zoom lens of Example 4 at a time of focusing to infinity at the wide angle end.
Figure 18:
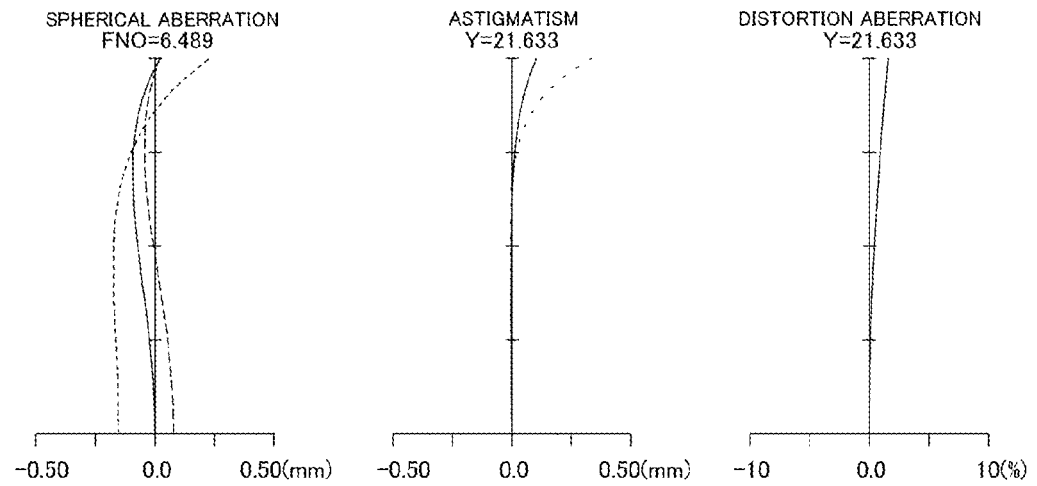
FIG. 18 shows a spherical aberration diagram, an astigmatism diagram, and a distortion aberration diagram of the zoom lens of Example 4 at a time of focusing to infinity at an intermediate focal length.
Figure 19:
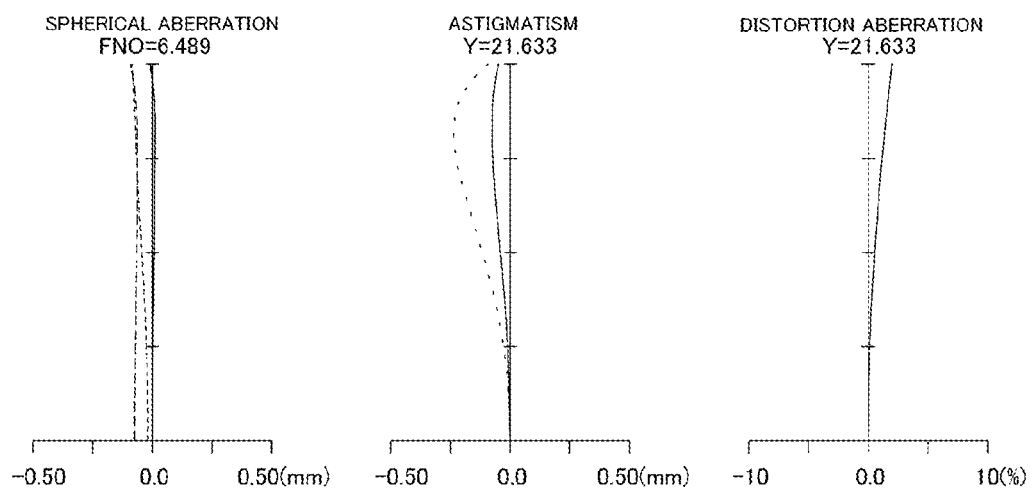
FIG. 19 shows a spherical aberration diagram, an astigmatism diagram, and a distortion aberration diagram of the zoom lens of Example 4 at a time of focusing to infinity at the telephoto end.
Figure 20:
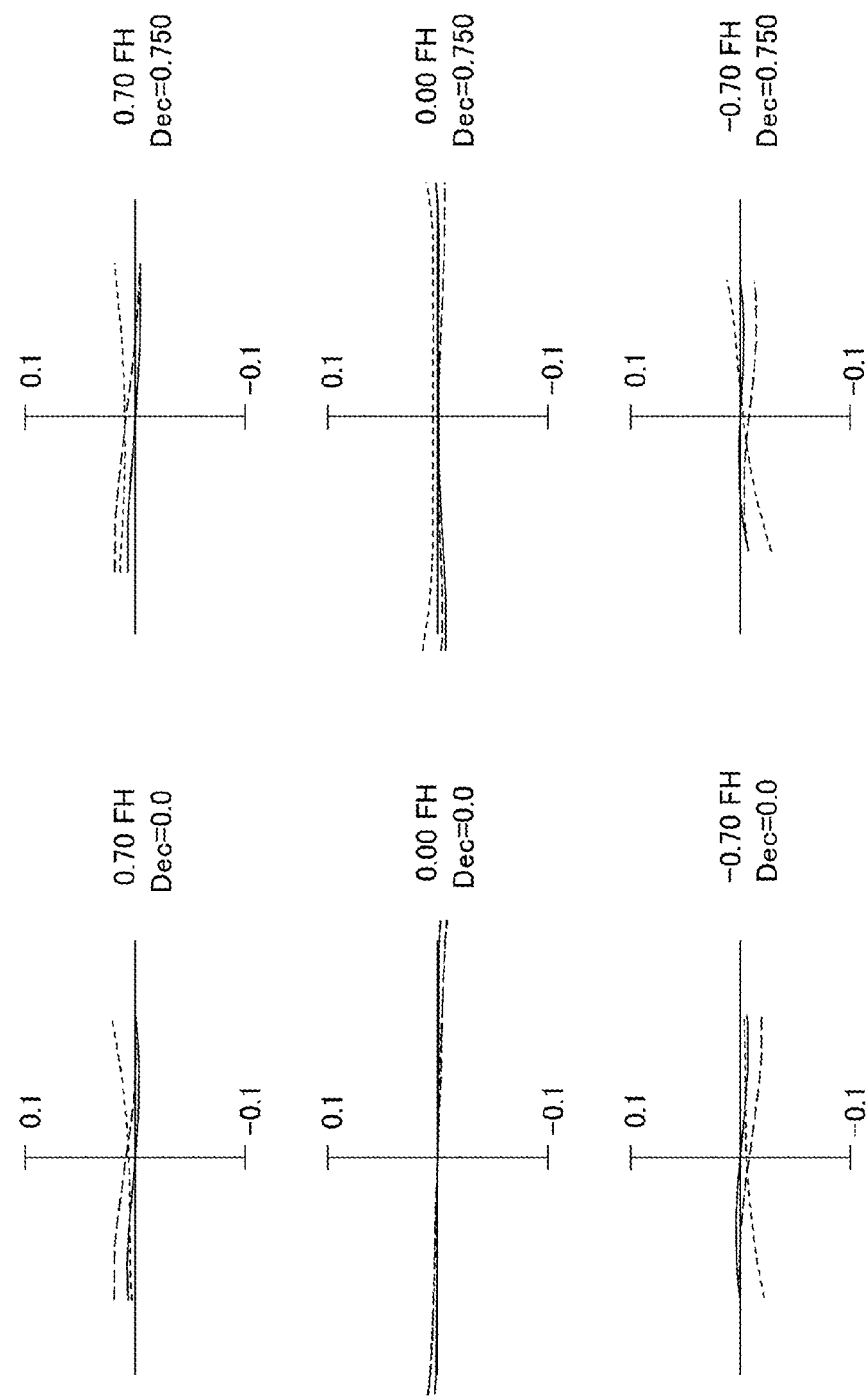
FIG. 20 shows lateral aberration diagrams of the zoom lens of Example 4 at a time of focusing to infinity at the telephoto end.

FIGS. 17 to 19 each show longitudinal aberration diagrams of the zoom lens at the wide angle end, the intermediate focal length, and the telephoto end at a time of focusing to infinity. FIG. 20 shows lateral aberration diagrams of the zoom lens.

TABLE 18

| SURFACE NO. | | r | d | Nd | vd | ΔPgF | H |
|---|---|---|---|---|---|---|---|
| 1 | | 238.5870 | 3.000 | 1.80611 | 40.73 | −0.0078 | 45.000 |
| 2 | | 105.6524 | 11.138 | 1.49700 | 81.61 | 0.0375 | 44.300 |
| 3 | | 1682.0251 | 0.300 | | | | 44.300 |
| 4 | | 114.8475 | 11.323 | 1.49700 | 81.61 | 0.0375 | 44.200 |
| 5 | | −2049.3873 | D5 | | | | 43.900 |
| 6 | | −263.2266 | 2.000 | 1.72916 | 54.67 | | 19.200 |
| 7 | | 63.7471 | 5.667 | | | | 18.700 |
| 8 | | −68.8307 | 2.000 | 1.48749 | 70.44 | | 18.700 |
| 9 | | 86.5839 | 4.112 | 1.84666 | 23.78 | | 19.600 |
| 10 | | 1487.4929 | D10 | | | | 19.800 |
| 11 | | 170.6233 | 5.460 | 1.49700 | 81.61 | 0.0375 | 20.000 |
| 12 | | −88.8044 | 0.300 | | | | 20.100 |
| 13 | | 85.6951 | 4.969 | 1.49700 | 81.61 | 0.0375 | 19.800 |
| 14 | | −292.4560 | 0.300 | | | | 19.600 |
| 15 | | 55.9111 | 6.760 | 1.49700 | 81.61 | 0.0375 | 18.700 |
| 16 | | −108.0955 | 1.800 | 1.91082 | 35.25 | | 18.200 |
| 17 | | 149.0303 | D17 | | | | 17.600 |
| 18 | | 55.0261 | 1.500 | 1.84666 | 23.78 | | 14.100 |
| 19 | | 28.7456 | 5.277 | 1.64769 | 33.84 | | 13.500 |
| 20 | | −522.7116 | 1.853 | | | | 13.100 |
| 21 | STOP | INF | D21 | | | | VARIABLE |
| 22 | | −797.7002 | 2.917 | 1.84666 | 23.78 | | 11.100 |
| 23 | | −58.1473 | 1.000 | 1.72916 | 54.67 | | 10.800 |
| 24 | | 42.5636 | D24 | | | | 10.100 |
| 25 | | −98.7167 | 1.000 | 1.92286 | 20.88 | | 7.200 |
| 26 | | 26.9385 | 3.866 | 1.64769 | 33.84 | | 7.100 |
| 27 | | −27.6166 | 1.071 | | | | 7.100 |
| 28 | | 2273.8962 | 3.055 | 1.69895 | 30.05 | | 7.200 |
| 29 | | −25.5159 | 1.000 | 1.72916 | 54.67 | | 7.300 |
| 30 | | 32.6011 | 2.261 | | | | 7.400 |
| 31 | | 53.4704 | 4.400 | 1.62004 | 36.30 | | 7.900 |
| 32 | | −18.2893 | 1.000 | 1.83481 | 42.72 | | 8.000 |
| 33 | | 58.8733 | 0.300 | | | | 8.500 |
| 34 | | 28.5544 | 3.020 | 1.64769 | 33.84 | | 8.900 |
| 35 | | 105.4962 | 15.449 | | | | 9.100 |
| 36 | | 33.3755 | 6.219 | 1.60342 | 38.01 | | 12.400 |
| 37 | | −42.3000 | 4.135 | | | | 12.400 |
| 38 | | −28.4743 | 1.500 | 1.95375 | 32.32 | | 11.400 |
| 39 | | 215.3737 | 39.727 | | | | 11.800 |
| 40 | | INF | 2.500 | 1.51680 | 64.20 | | 21.600 |
| 41 | | INF | 1.000 | | | | 21.600 |

TABLE 19

| f | 205.810 | 346.220 | 582.664 |
|---|---|---|---|
| Fno | 6.489 | 6.489 | 6.489 |
| ω | 5.946 | 3.524 | 2.084 |
| Y | 21.633 | 21.633 | 21.633 |
| TL | 320.000 | 320.000 | 320.000 |

TABLE 20

| f | 205.810 | 346.220 | 582.664 |
|---|---|---|---|
| PHOTOGRAPHING DISTANCE | INF | INF | INF |
| D5 | 56.735 | 90.089 | 113.674 |
| D10 | 61.385 | 29.939 | 1.000 |
| D17 | 17.502 | 15.594 | 20.948 |
| D21 | 3.696 | 6.747 | 2.076 |
| D24 | 18.354 | 15.303 | 19.974 |

TABLE 21

| f | 205.810 | 346.220 | 582.664 |
|---|---|---|---|
| PHOTOGRAPHING DISTANCE | 1965.73 | 1965.73 | 1965.73 |
| D21 | 5.232 | 11.324 | 14.462 |
| D24 | 16.818 | 10.726 | 7.588 |

TABLE 22

| f | 205.810 | 346.220 | 582.664 |
|---|---|---|---|
| APERTURE STOP DIAMETER | 23.996 | 24.857 | 23.417 |

TABLE 23

| GROUP | SURFACE NO. | FOCAL LENGTH |
|---|---|---|
| G1 | 1-5 | 212.924 |
| G2 | 6-10 | −55.683 |
| G3 | 11-17 | 62.543 |
| G4 | 18-21 | 102.66 |
| G5 | 22-24 | −61.776 |
| G6 | 25-39 | −51.707 |

TABLE 24

| | | EXAMPLE 1 | EXAMPLE 2 | EXAMPLE 3 | EXAMPLE 4 |
|---|---|---|---|---|---|
| CONDITIONAL EXPRESSION (1) | β rt | 3.461 | 3.625 | 3.660 | 4.204 |
| CONDITIONAL EXPRESSION (2) | f3/(fw × ft)$^{1/2}$ | 0.146 | 0.230 | 0.160 | 0.181 |
| CONDITIONAL EXPRESSION (5) | f1/ft | 0.436 | 0.473 | 0.336 | 0.365 |
| CONDITIONAL EXPRESSION (7) | Lt/ft | 0.636 | 0.628 | 0.541 | 0.549 |
| CONDITIONAL EXPRESSION (8) | β 3rt | −1.599 | −1.248 | −1.514 | −1.599 |
| CONDITIONAL EXPRESSION (9) | β 2t | −1.433 | −1.693 | −1.963 | −1.710 |
| CONDITIONAL EXPRESSION (10) | β LAt/β LBt | 1.362 | 1.215 | 1.093 | 0.979 |
| CONDITIONAL EXPRESSION (11) | CrLAr/ft | 0.149 | 0.095 | 0.085 | 0.073 |
| CONDITIONAL EXPRESSION (12) | f2/fw | −0.306 | −0.458 | −0.185 | −0.271 |
| CONDITIONAL EXPRESSION (13) | \| f1/f2 \| | 4.515 | 3.894 | 3.422 | 3.824 |
| CONDITIONAL EXPRESSION (14) | (1 − β vct) × β vcrt | −1.747 | −1.871 | −1.871 | −1.871 |

When effects of the present invention are compared with those of the conventional technologies, the telephoto ratio at the telephoto end is 0.54 to 0.64 in the examples of the present invention whereas the telephoto ratio at the telephoto end in Example 1 of Japanese Patent Laid-Open No. 2015-64492 is 1.38 and that in Example 4 of Japanese Patent Laid-Open No. 2016-126278 is 0.68. The present invention has turned out to be effective for downsizing of the optical overall length at the telephoto end.

According to the present invention, a zoom lens which achieves a longer focal length and has a shorter optical overall length at the telephoto end, and an imaging apparatus provided with the zoom lens can be provided.

What is claimed is:

1. A zoom lens, comprising, in order from an object side, a first lens group having positive refractive power, a second lens group having negative refractive power, a composite positive lens group having positive refractive power as a whole, and a composite negative lens group having negative refractive power as a whole, wherein
the composite positive lens group comprises, at a most object side, a third lens group having positive refractive power, and comprises one or more lens groups having positive refractive power,
the composite negative lens group comprises a negative A lens group having negative refractive power and being arranged at a most object side, and comprises a negative B lens group having negative refractive power,
changing focal length is performed by varying distances between the lens groups, and
the following conditional expressions are satisfied:

$$3.44 < \beta rt < 4.50 \quad (1)$$

$$0.10 < f3/(fw \times ft)^{1/2} < 0.46 \quad (2)$$

where

βrt: composite lateral magnification of the composite negative lens group at a telephoto end,
f3: focal length of the third lens group,
fw: focal length of the zoom lens at a wide angle end, and
ft: focal length of the zoom lens at the telephoto end.

2. The zoom lens according to claim 1, wherein the third lens group comprises at least one positive lens made from an anomalous dispersion glass material satisfying, with respect to a g-line and an F-line, the following condition:

$$0.012 < \Delta PgF3 < 0.100 \quad (3)$$

where

ΔPgF3: deviation of a partial dispersion ratio of the anomalous dispersion glass material from a reference line when a line passing through coordinates of glass material C7 (partial dispersion ratio: 0.5393, Abbe numbers vd: 60.49) and coordinates of glass material F2 (partial dispersion ratio: 0.5829, Abbe numbers vd: 36.30) is assumed to be the reference line.

3. The zoom lens according to claim 1, wherein the first lens group comprises at least one positive lens made from an anomalous dispersion glass material satisfying, with respect to a g-line and an F-line, the following condition:

$$0.012 < \Delta PgF1 < 0.100 \quad (4)$$

where

ΔPgF1: deviation of a partial dispersion ratio of the anomalous dispersion glass material from a reference line when a line passing through coordinates of glass material C7 (partial dispersion ratio: 0.5393, Abbe numbers vd: 60.49) and coordinates of glass material F2 (partial dispersion ratio: 0.5829, Abbe numbers vd: 36.30) is assumed to be the reference line.

4. The zoom lens according to claim 1, wherein the following conditional expression is satisfied:

$$0.25 < f1/ft < 0.61 \quad (5)$$

where f1: focal length of the first lens group.

5. The zoom lens according to claim 1, wherein the first lens group comprises at least one negative lens made from an anomalous dispersion glass material satisfying the following condition:

$$-0.010 < \Delta PgFn < 0.012 \quad (6)$$

where

ΔPgFn: deviation of a partial dispersion ratio of the anomalous dispersion glass material from a reference line when a line passing through coordinates of glass material C7 (partial dispersion ratio: 0.5393, Abbe numbers vd: 60.49) and coordinates of glass material F2 (partial dispersion ratio: 0.5829, Abbe numbers vd: 36.30) is assumed to be the reference line.

6. The zoom lens according to claim 1, wherein the following conditional expression is satisfied:

$$0.50 < Lt/ft < 0.73 \quad (7)$$

where

Lt: distance from a most object side surface to an image plane in the zoom lens at the telephoto end.

7. The zoom lens according to claim 1, wherein the following conditional expression is satisfied:

$$-1.83 < \beta 3rt < -0.95 \quad (8)$$

where

β3rt: composite lateral magnification of the third lens group and all the lens groups arranged therebehind at the telephoto end.

8. The zoom lens according to claim 1, wherein the following conditional expression is satisfied:

$$-4.50 < \beta 2t < -0.90 \quad (9)$$

where

β2t: lateral magnification of the second lens group at the telephoto end.

9. The zoom lens according to claim 1, wherein focusing to a proximity object is performed by movement, in the optical axis direction, of any of lens groups included in the composite negative lens group or a part of any of the lens groups included in the composite negative lens group.

10. The zoom lens according to claim 1, wherein the lens groups having negative refractive power included in the composite negative lens group consists of the negative A lens group and the negative B lens group.

11. The zoom lens according to claim 1, wherein focusing to a proximity object is performed by movement, in the optical axis direction, of only the negative A lens group.

12. The zoom lens according to claim 11, wherein the negative A lens group comprises one lens unit.

13. The zoom lens according to claim 1, wherein the following conditional expression is satisfied:

$$0.95 < \beta LAt/\beta LBt < 4.00 \quad (10)$$

where

βLAt: lateral magnification of the negative A lens group at the telephoto end, and βLBt: lateral magnification of the negative B lens group at the telephoto end.

14. The zoom lens according to claim 1, wherein the following conditional expression is satisfied:

$$0.05 < CrLAr/ft < 0.18 \quad (11)$$

where

CrLAr: curvature radius of a most image plane side surface in the negative A lens group.

15. The zoom lens according to claim 1, wherein the following conditional expression is satisfied:

$$-0.85 < f2/fw < -0.10 \quad (12)$$

where f2: focal length of the second lens group.

16. The zoom lens according to claim 1, wherein the following conditional expression is satisfied:

$$2.50 < |f1/f2| < 5.10 \quad (13)$$

where f1: focal length of the first lens group, and f2: focal length of the second lens group.

17. The zoom lens according to claim 1, wherein a lens unit having a biconvex shape is arranged at a most object side in the third lens group.

18. The zoom lens according to claim 1, further comprising a vibration-proof group configured to move an image by movement, in a direction perpendicular to the optical axis, of at least one of the lenses included in the zoom lens, wherein the following condition is satisfied:

$$-6.00 < (1-\beta vct) \times \beta vcrt < -0.50 \quad (14)$$

where

βvct: lateral magnification of the vibration-proof group at the telephoto end, and βvcrt: composite lateral magnification of all the lens groups arranged to be closer to an image side than the vibration-proof group at the telephoto end.

19. An imaging apparatus comprising:

the zoom lens according to claim 1; and an imaging device arranged closer to the image plane side than the zoom lens and configured to convert an optical image formed by the zoom lens to an electrical signal.

\* \* \* \* \*